(12) United States Patent
Daiku

(10) Patent No.: US 8,279,164 B2
(45) Date of Patent: Oct. 2, 2012

(54) SURFACE LIGHT SOURCE CAPABLE OF CHANGING RANGE OF SPREAD ANGLE OF EXIT LIGHT, AND LIQUID CRYSTAL DISPLAY APPARATUS USING THIS SURFACE LIGHT SOURCE

(75) Inventor: Yasuhiro Daiku, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 623 days.

(21) Appl. No.: 12/435,183

(22) Filed: May 4, 2009

(65) Prior Publication Data

US 2009/0213300 A1      Aug. 27, 2009

Related U.S. Application Data

(62) Division of application No. 11/641,899, filed on Dec. 19, 2006, now abandoned.

(30) Foreign Application Priority Data

Dec. 21, 2005   (JP) ................................. 2005-368290

(51) Int. Cl.
   *G09G 3/36* (2006.01)
   *G09G 5/00* (2006.01)
   *G02F 1/1337* (2006.01)
   *F21V 7/04* (2006.01)

(52) U.S. Cl. ........ 345/102; 345/635; 349/123; 362/611; 362/613

(58) Field of Classification Search ................... 345/102
   See application file for complete search history.

(56) References Cited

U.S. PATENT DOCUMENTS 5,142,275 A * 8/1992 Rockel ........................ 345/635

6,967,698 B2   11/2005 Tanoue et al.
6,979,095 B2 * 12/2005 Min et al. ...................... 362/611
7,068,336 B2 *  6/2006 Oh et al. ....................... 349/123

(Continued)

FOREIGN PATENT DOCUMENTS

CN       1567050 A      1/2005

(Continued)

OTHER PUBLICATIONS

Chinese Office Action (and English translation thereof) dated May 23, 2008, issued in a counterpart Chinese Application.

(Continued)

*Primary Examiner* — Alexander S Beck
*Assistant Examiner* — Charles V Hicks
(74) *Attorney, Agent, or Firm* — Holtz, Holtz, Goodman & Chick, PC

(57) ABSTRACT

A surface light source includes first and second light sources that emit lights, and an optical deflection element. The optical deflection element changes light emitted from the first light source into first illumination light having a maximum value of an exit light intensity present in a direction parallel to a normal line of the surface light source, a spread angle range, and high directivity in a direction of the normal line and allows the changed light to exit therefrom. The optical deflection element also changes light emitted from the second light source into second illumination light having a maximum value of an exit light intensity in an oblique direction inclined at an angle with respect to the normal line and a spread angle range wider than that of the first illumination light and allows the changed light to exit therefrom.

15 Claims, 11 Drawing Sheets

U.S. PATENT DOCUMENTS

| | | | |
|---|---|---|---|
| 7,072,116 B2 | 7/2006 | Okuwaki et al. | |
| 7,452,119 B2 | 11/2008 | Onishi et al. | |
| 2002/0044436 A1 | 4/2002 | Ohkawa | |
| 2005/0253980 A1 | 11/2005 | Saito et al. | |
| 2005/0259440 A1* | 11/2005 | Onishi et al. | 362/613 |
| 2006/0082884 A1 | 4/2006 | Feng et al. | |
| 2006/0125772 A1* | 6/2006 | Takeda | 345/102 |
| 2006/0232995 A1 | 10/2006 | Wu et al. | |

FOREIGN PATENT DOCUMENTS

| | | |
|---|---|---|
| CN | 1680853 A | 10/2005 |
| CN | 1700072 A | 11/2005 |
| EP | 1 544 537 A1 | 6/2005 |
| JP | 05-142540 A | 6/1993 |
| JP | 2000-113706 A | 4/2000 |
| JP | 2003-207610 A | 7/2003 |
| JP | 2003-249111 A | 9/2003 |
| JP | 2004-111383 A | 4/2004 |
| JP | 2004-133334 A | 4/2004 |
| JP | 2005-174706 A | 6/2005 |
| JP | 2005-331565 A | 12/2005 |
| TW | 200532328 A | 10/2005 |

OTHER PUBLICATIONS

Taiwanese Office Action dated Mar. 1, 2011 (and English translation thereof) in counterpart Taiwanese Application No. 095147779.

"Color Liquid Crystal Display": Chin Shun Rei. Kenko Publisher: Nov. 2011: p. 127, Figs. 6 to 16 (a)-(b), Figs. 6-17.

Japanese Office Action dated May 11, 2010 and English translation thereof, issued in counterpart Japanese Application No. 2005-368290.

\* cited by examiner

SURFACE LIGHT SOURCE CAPABLE OF CHANGING RANGE OF SPREAD ANGLE OF EXIT LIGHT, AND LIQUID CRYSTAL DISPLAY APPARATUS USING THIS SURFACE LIGHT SOURCE

CROSS-REFERENCE TO RELATED APPLICATIONS

The present application is a Divisional Application of U.S. application Ser. No. 11/641,899 filed Dec. 19, 2006 now abandoned, which is based upon and claims the benefit of priority from prior Japanese Patent Application No. 2005-368290, filed Dec. 21, 2005, the entire contents of which are incorporated herein by reference.

BACKGROUND OF THE INVENTION

1. Field of the Invention

The present invention relates to a surface light source capable of changing a range of a spread angle of exit light, and a liquid crystal display apparatus that can vary a viewing angle by using this surface light source.

2. Description of the Related Art

A liquid crystal display apparatus has a structure in which a surface light source that emits light having a substantially uniform intensity to a substantially entire surface of a liquid crystal display device is arranged on an opposite side of an observation side of the liquid crystal display device having a screen region in which a plurality of pixels that control transmission of light are aligned in a matrix form. This surface light source is constituted of a light guide plate and light-emitting elements. The light guide plate is formed of a plate-like transparent member having a structure in which an incidence facet from which light enters is formed on at least one facet of this transparent member, an exit surface from which light that has entered from the incidence facet exits is formed on one of two plate surfaces, and a reflection surface on which light that has entered from the incidence facet is reflected toward the exit surface is formed on the other plate surface. The light-emitting elements are arranged to face the incidence facet of the light guide plate, and emit light toward the incidence facet (Jpn. Pat. Appln. KOKAI Publication No. 2000-113706).

Generally, the liquid crystal display apparatus is designed to obtain a wide viewing angle, and hence a third person may possibly peep display of this apparatus from a direction inclined toward a front direction (a normal line direction of the liquid crystal display device).

Therefore, there has been proposed a liquid crystal display apparatus that can perform wide viewing angle display and narrow viewing angle display with high security properties that is not peeped by a third person by arranging a viewing angle restricting liquid crystal element on one surface side of the liquid crystal display device to lower visibility from a direction inclined with respect to a front direction (Jpn. Pat. Appln. KOKAI Publication No. 2004-133334).

According to this viewing angle restricting liquid crystal element, electrodes having predetermined shapes are provided on opposed inner surfaces of a pair of substrates in accordance with each sectional region, and liquid crystal molecules in a liquid crystal layer provided between the pair of substrates are aligned in an alignment state having a viewing angle in one direction with respect to a normal line direction of the liquid crystal display device and another alignment state having a viewing angle in a direction inclined in an opposite direction in accordance with each of the sectional regions.

This liquid crystal display apparatus applies a voltage to a space between electrodes of the viewing angle restricting liquid crystal element to lower visibility from an oblique direction, thereby restricting a viewing angle of a display image in the liquid crystal display device.

That is, when a voltage is not applied to the space between the electrodes of the viewing angle restricting liquid crystal element, the viewing angle restricting liquid crystal element enters a non-display state, and a display image of the liquid crystal display device can be seen with a wide viewing angle. On the other hand, when a voltage is applied to the space between the electrodes of the viewing angle restricting liquid crystal element, a display image of the liquid crystal display device is hidden by display of the viewing angle restricting liquid crystal element as seen from a direction inclined toward one side with respect to the front direction and a direction inclined toward the other side. That is, the display image of the liquid crystal display device is hidden by display in each sectional region having a viewing angle in the direction inclined toward one side of the viewing angle restricting liquid crystal element and display corresponding to the electrodes having the predetermined shapes in the other sectional region having a viewing angle in the direction inclined toward the opposite side. Therefore, the display image of the liquid crystal display device cannot be recognized from the one direction and the direction inclined to the opposite side, the viewing angle of the display image is apparently restricted, and the viewing angle of the display image is narrowed.

However, according the viewing angle restricting liquid crystal element in which liquid crystal molecules are aligned in different alignment states in accordance with each sectional region obtained by dividing a region corresponding to a screen of the liquid crystal display device, complicated alignment processing (rubbing processing of an alignment film) whose direction varies in accordance with each sectional region must be applied to each of the inner surfaces of the pair of substrates, and hence manufacture is difficult.

BRIEF SUMMARY OF THE INVENTION

It is an object of the present invention to provide a surface light source that can change a range of a spread angle of exit light.

It is another object of the present invention to provide a liquid crystal display apparatus that can vary a viewing angle by using a surface light source that can change a range of a spread angle of exit light.

According to a first aspect of the present invention, there is provided a surface light source comprising:

a first light source and at least one second light source that emit lights; and an optical deflection element that changes light emitted from the first light source into first illumination light having a maximum value of an exit light intensity present in a direction parallel to a normal line of the surface light source, a predetermined spread angle range, and high directivity in a direction of the normal line and allows the changed light to exit therefrom; and that changes light emitted from the second light source into second illumination light having a maximum value of an exit light intensity in an oblique direction inclined at a predetermined angle with respect to the normal line of the surface light source and a spread angle range wider than that of the first illumination light and allows the changed light to exit therefrom.

Further, according to a second aspect of the present invention, there is provided a liquid crystal display apparatus comprising:

a liquid crystal display device that includes a screen region in which a plurality of pixels that control transmission of light are arranged in a matrix form, an image signal being applied to each of the plurality of pixels, thereby displaying an image corresponding to the image signal;

a first light source and at least one second light source that emit lights; and a surface light source including an optical deflection element that changes light emitted from the first light source into first illumination light having a maximum value of an exit, light intensity present in a direction parallel to a normal line of the surface light source, a predetermined spread angle range, and high directivity in a direction of the normal line and allows the first illumination light to exit therefrom; and that changes light emitted from the second light source into second illumination light having a maximum value of an exit light intensity present in an oblique direction inclined at a predetermined angle with respect to the normal line of the surface light source and a spread angle range wider than that of the first illumination light and allows the second illumination light to exit therefrom, the surface light source being arranged on an opposite side of an observation side of the liquid crystal display device.

Furthermore, according to a third aspect of the present invention, there is provided a liquid crystal display apparatus comprising:

a liquid crystal display device that has a screen region in which a plurality of pixels that control transmission of light are arranged in a matrix form, an image signal being applied to each of the plurality of pixels, thereby displaying an image corresponding to the image signal;

a surface light source arranged on an opposite side of an observation side of the liquid crystal display device, the surface light source including:

a first light source and at least one second light sources that emit lights; and an optical deflection element that changes light emitted from the first light source into first illumination light having a maximum value of an exit light intensity present in a direction parallel to a normal line of the surface light source, a predetermined spread angle range, and high directivity in the normal line direction and allows the first illumination light to exit therefrom; and that changes light emitted from the second light source into second illumination light having a maximum value of an exit light intensity present in an oblique direction inclined at a predetermined angle with respect to the normal line of the surface light source and a spread angle range wider than that of the first illumination light and allows the second illumination light to exit therefrom; and a controller including a display drive circuit that supplies the image signal to each pixel in the liquid crystal display device to display an image in the liquid crystal display device, and a light source drive circuit that controls lighting states of the first and the second light sources in accordance with an image displayed in the liquid crystal display device.

According to the surface light source of the first aspect, a range of a spread angle of exist light can be changed.

According to the liquid crystal display apparatus of the second and the third aspects, a viewing angle can be changed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL
VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 4A and 4B are light ray views when a first and second light-emitting elements in the surface light source are turned on, in which FIG. 4A is a light ray view showing exit light when the first light-emitting element is turned on, and FIG. 4B is a light ray view showing exit light when the second light-emitting elements are turned on;

Figure 5A:
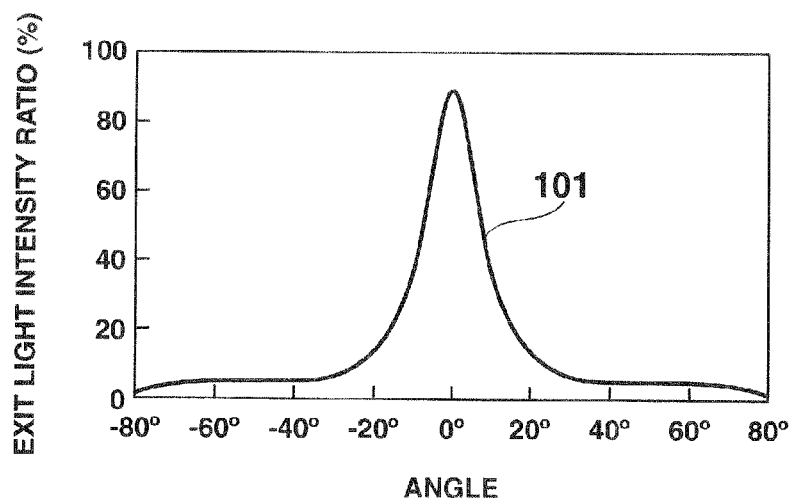
Figure 5B:
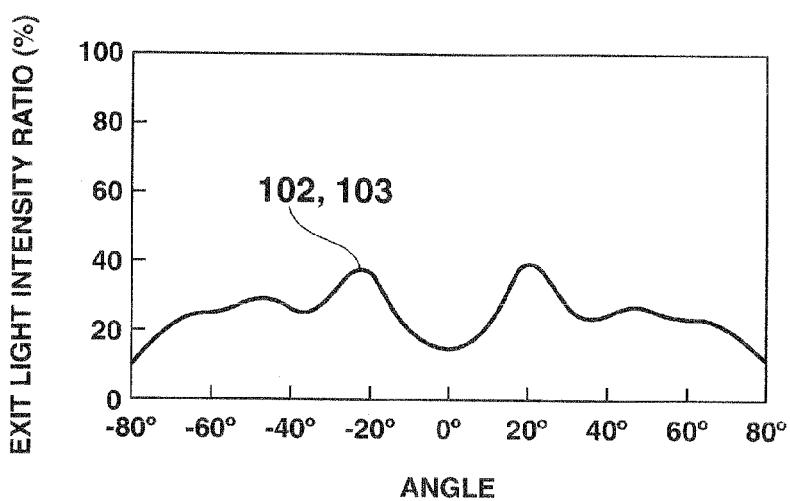
Figure 5C:
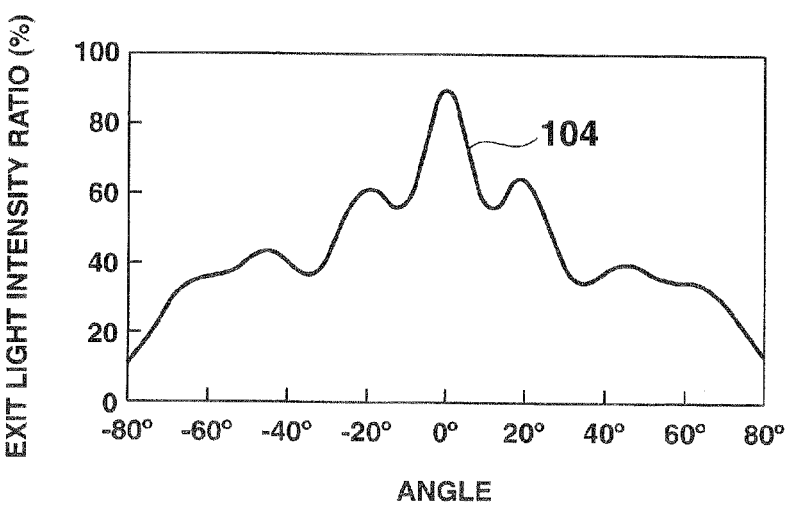
Figure 6:
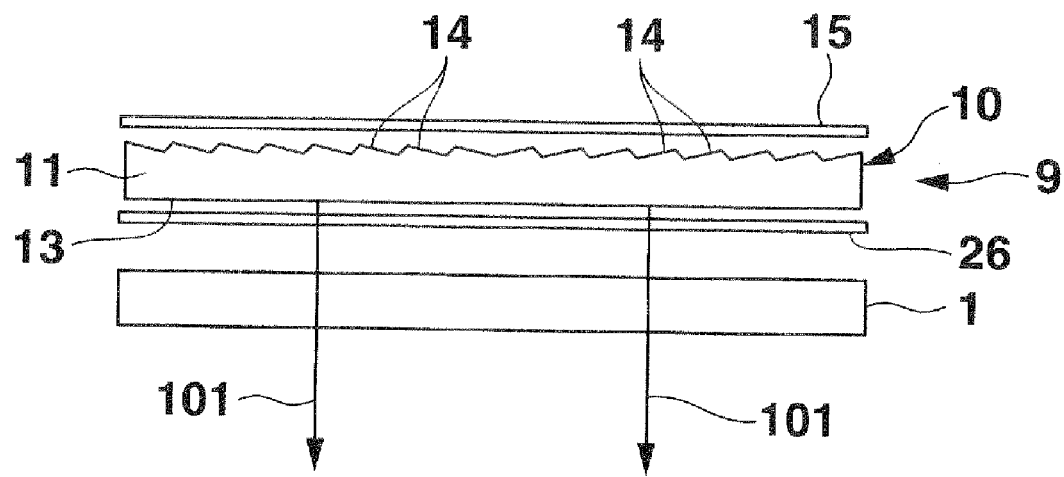
Figure 7:
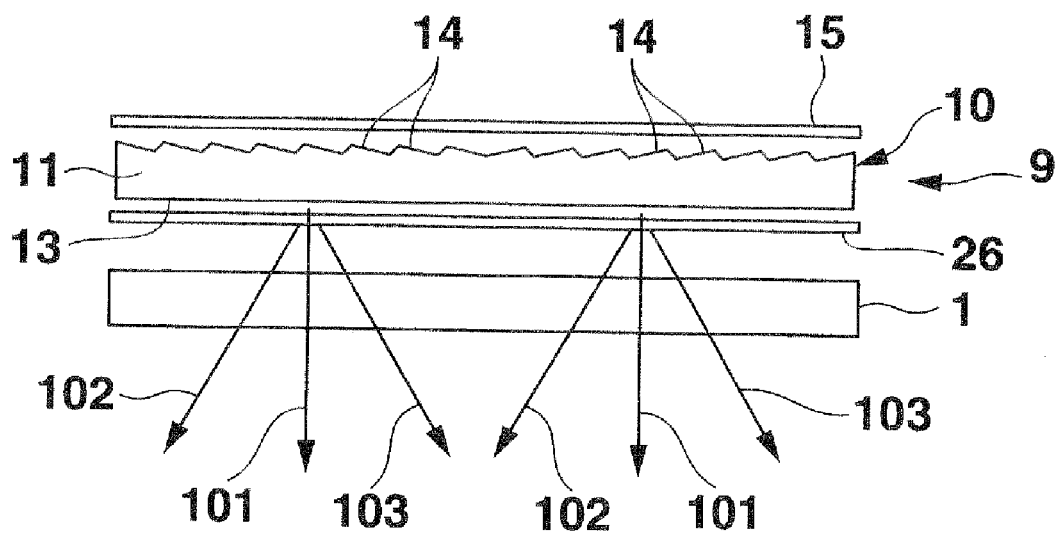
Figure 8A:
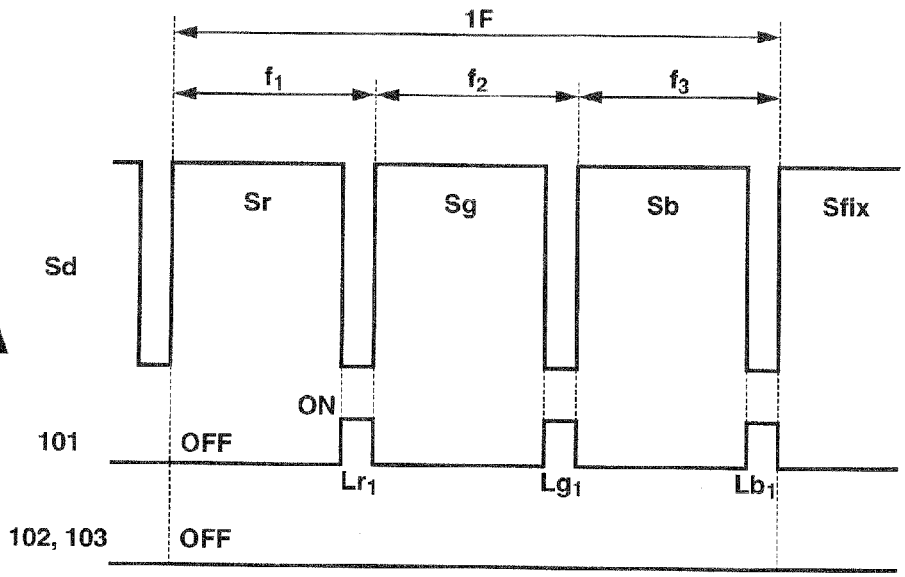
Figure 8B:
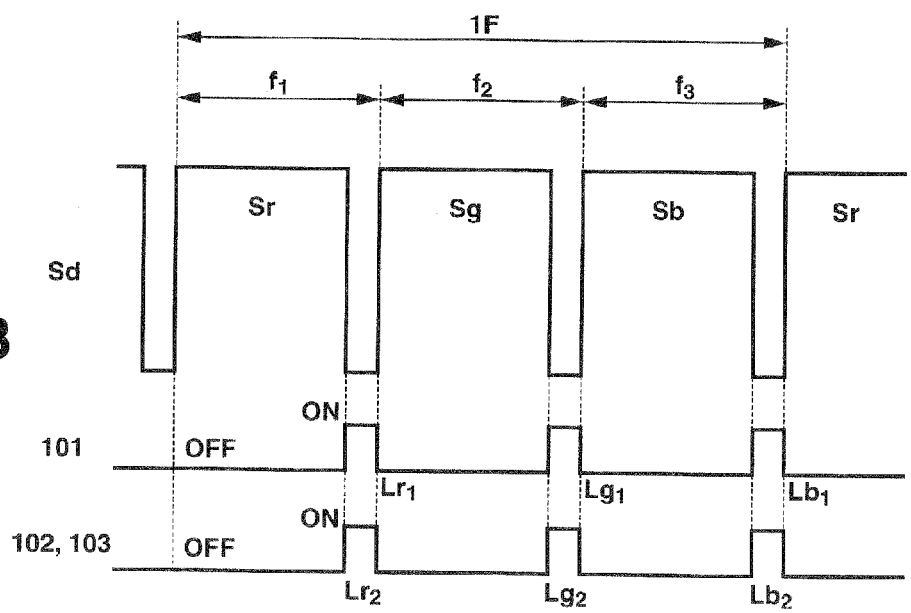
Figure 9:
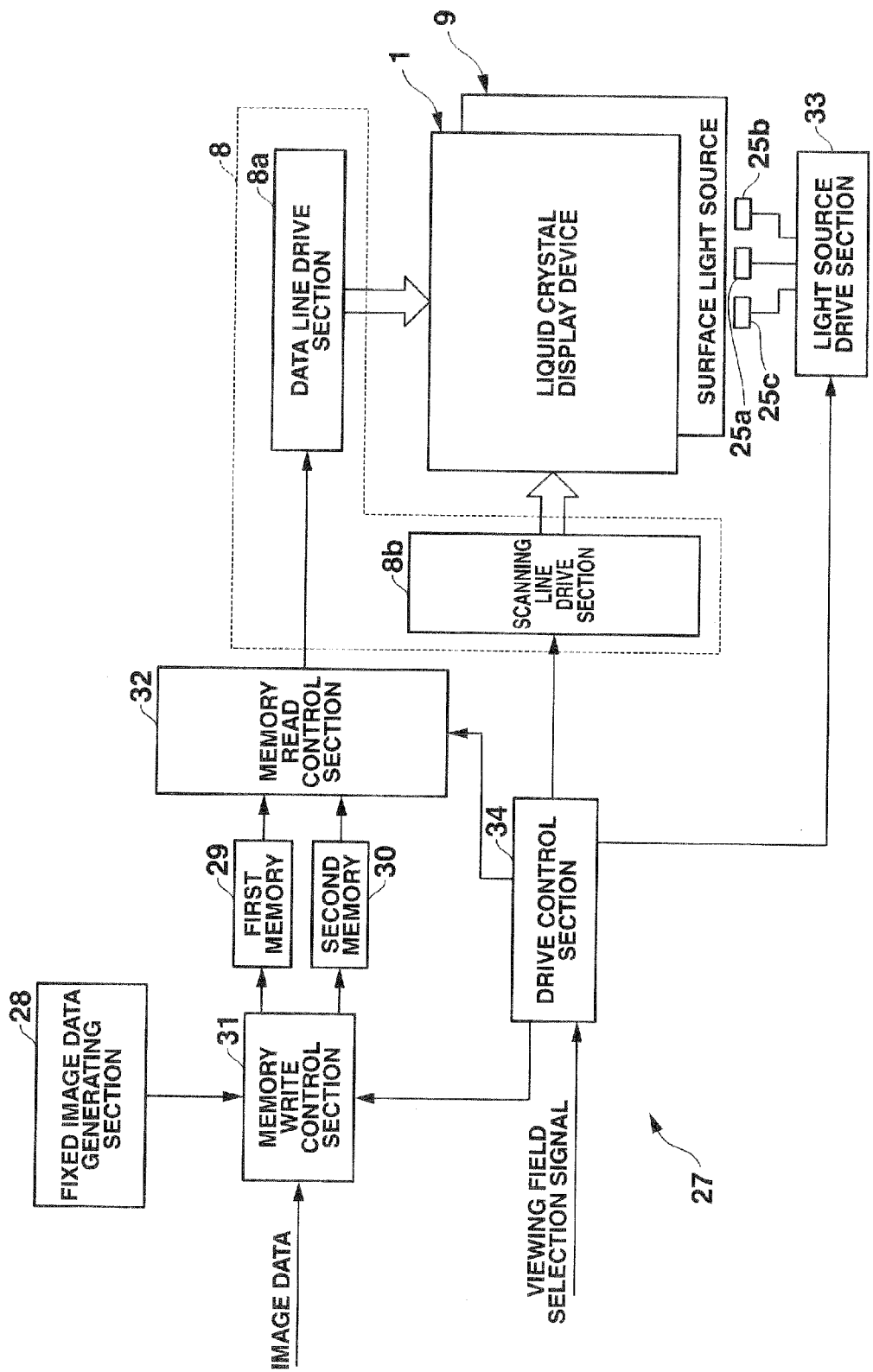
Figure 10A:
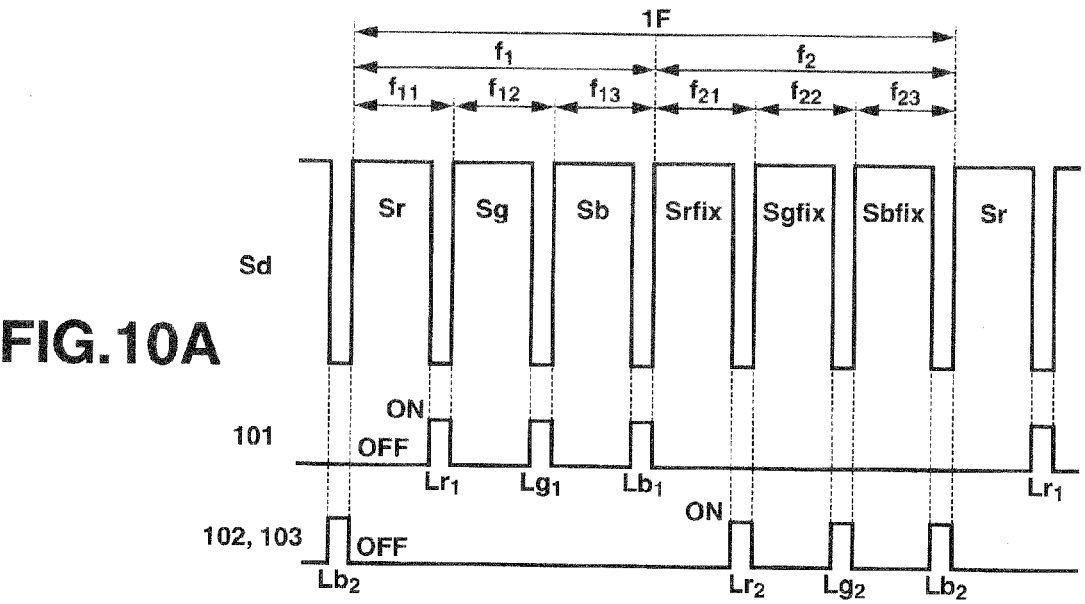
Figure 10B:
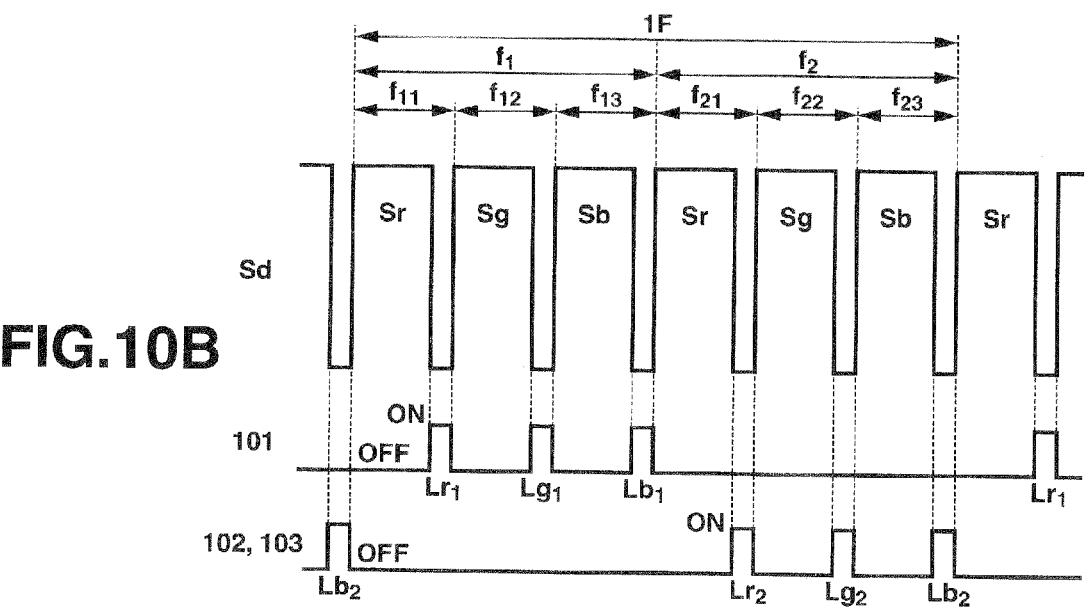
Figure 11A:
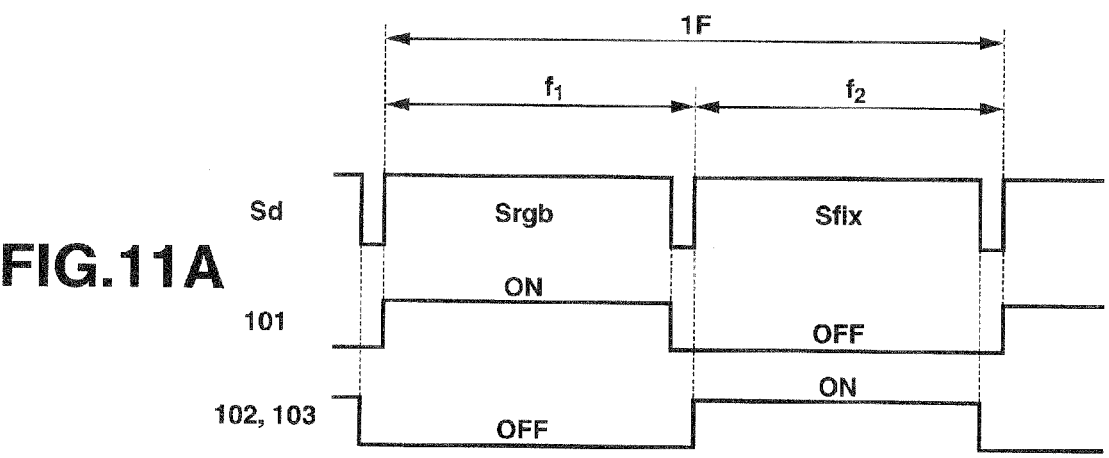
Figure 11B:
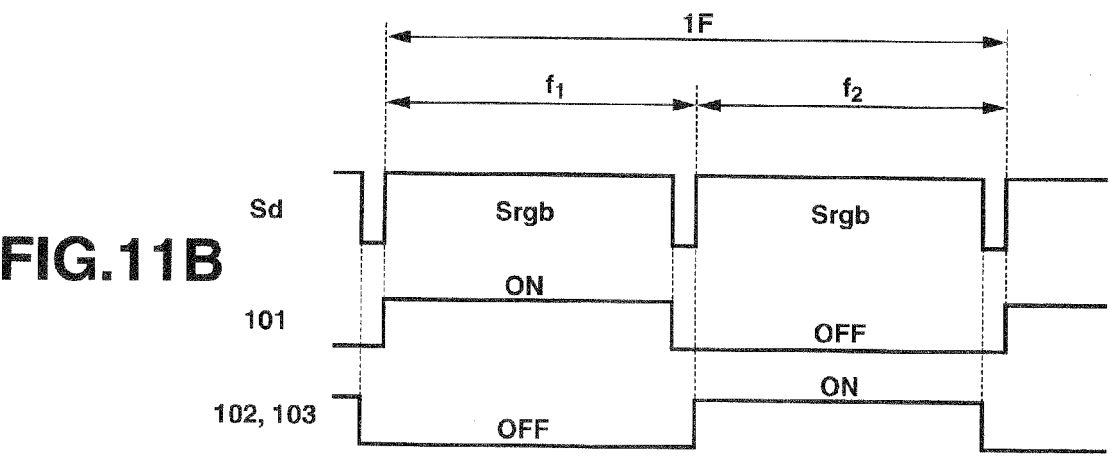
Figure 12B:
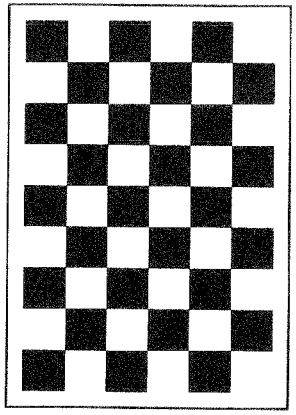
Figure 12A:
Figure 12C:
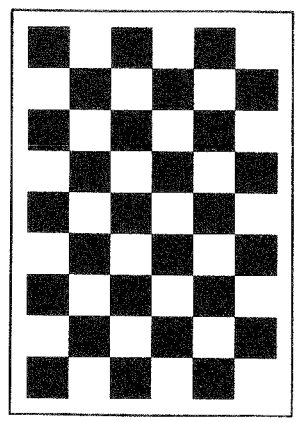
Figure 13B:
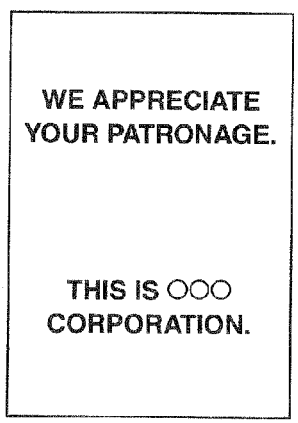
Figure 13A:
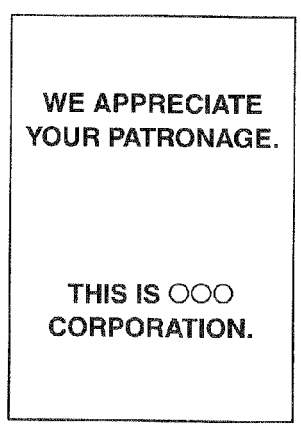
Figure 13C:
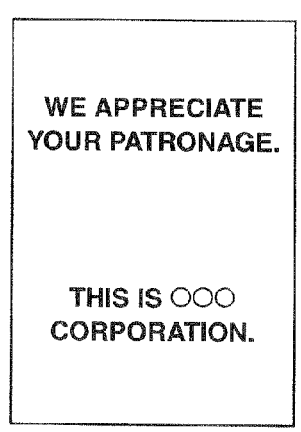
Figure 14:
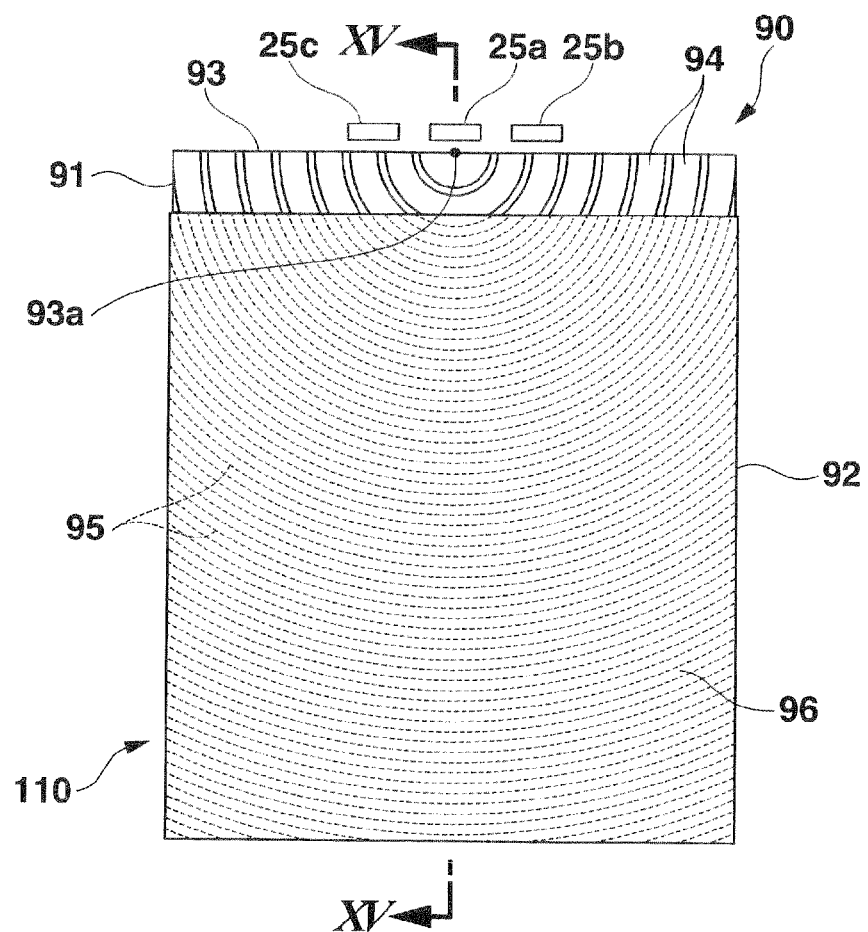
Figure 15:
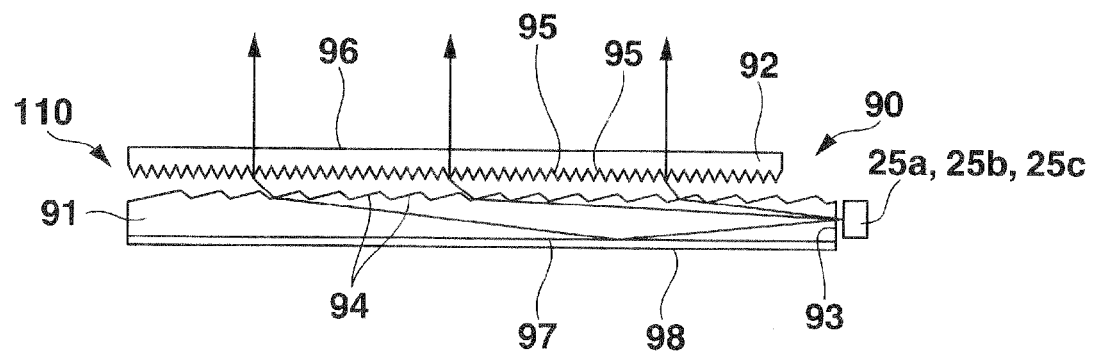

FIGS. 5A to 5C show intensity distributions of irradiation light from the surface light source, in which FIG. 5A is an intensity distribution chart of irradiation light when the first light-emitting element is turned on, FIG. 5B is an intensity distribution chart of irradiation light when the second light-emitting elements are turned on, and FIG. 5C is an intensity distribution chart of irradiation light when the first and the second light-emitting elements are simultaneously turned on;

FIG. 6 is an exit light ray view at the time of narrow-viewing angle display of the liquid crystal display apparatus;

FIG. 7 is an exit light ray view at the time of wide-viewing angle display of the liquid crystal display apparatus;

FIGS. 8A and 8B show driving sequences of the liquid crystal display device and the surface light source in a field sequential liquid crystal display apparatus, in which FIG. 8A is a driving sequence diagram at the time of narrow-viewing angle display, and FIG. 8B is a driving sequence diagram at the time of wide-viewing angle display;

FIG. 9 is a block circuit diagram of driving means showing a second embodiment according to the present invention;

FIGS. 10A and 10B show driving sequences of a liquid crystal display device and a surface light source when a field sequential liquid crystal display apparatus is applied in the second embodiment, in which FIG. 10A is a driving sequence diagram at the time of narrow-viewing angle display, and FIG. 103 is a driving sequence diagram at the time of wide-viewing angle display;

FIGS. 11A and 11B show driving sequences of a liquid crystal display device and a surface light source when a liquid crystal display apparatus including three color filters of red, green, and blue is applied in the second embodiment, in which FIG. 11A is a driving sequence diagram at the time of narrow-viewing angle display, and FIG. 11B is a driving sequence diagram at the time of wide-viewing angle display;

FIGS. 12A to 12C show examples of observed images at the time of narrow-viewing angle display in the liquid crystal display apparatus according to the second embodiment, in which FIG. 12A is an explanatory view showing a display example seen from a front direction, FIG. 12B is an explanatory view showing a display example as seen from a left-inclined direction, and FIG. 12C is an explanatory view showing a display example as seen from a direction inclined to a right side;

FIGS. 13A to 13C show examples of observed images at the time of wide-viewing angle display in the liquid crystal display apparatus according to the second embodiment, in which FIG. 13A is an explanatory view showing a display example seen from the front direction, FIG. 13B is an explanatory view showing a display example as seen from the left-inclined direction, and FIG. 13C is an explanatory view showing a display example as seen from the direction inclined toward the right side;

FIG. 14 is a front view seen from an exit side of a surface light source showing a third embodiment according to the present invention; and FIG. 15 is a cross-sectional view taken along a line XV-XV in FIG. 14.

DETAILED DESCRIPTION OF THE INVENTION

First Embodiment

Figure 1:
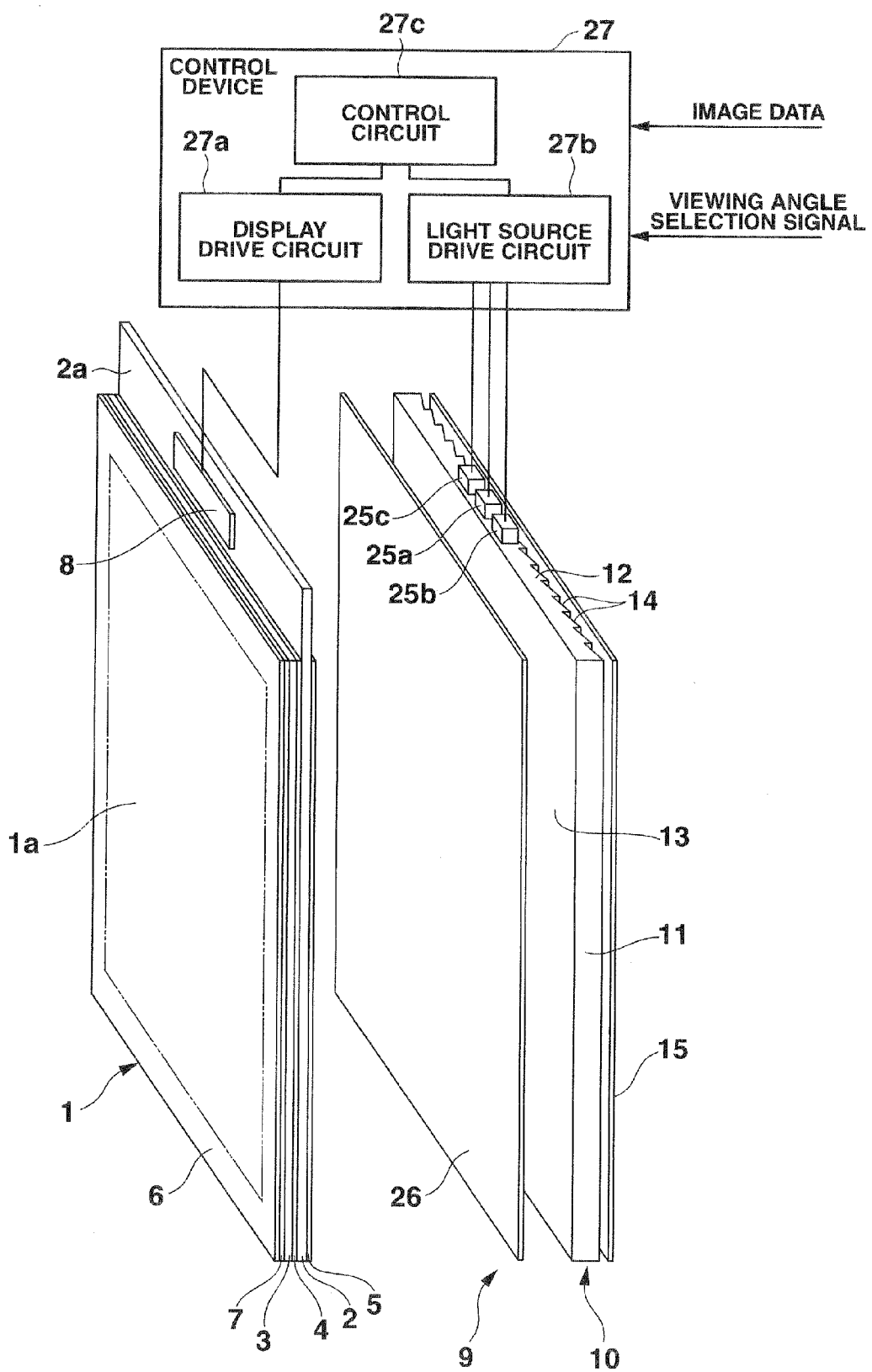
FIG. 1 is an exploded perspective view of a liquid crystal display apparatus showing a first embodiment according to the present invention.

FIGS. 1 to 8B show a first embodiment according to the present invention, wherein FIG. 1 is an exploded perspective view of a liquid crystal display apparatus.

As shown in FIG. 1, this liquid crystal display apparatus includes: a liquid crystal display device 1, a surface light source 9, and a controller 27. The display device includes a screen region 1a in which a plurality of pixels that control transmission of light are aligned in a matrix form, and displays an image corresponding to an image signal supplied to each of the plurality of pixels. The surface light source 9 is arranged on an opposite side of an observation side (a left side in FIG. 1) of this liquid crystal display device 1. The controller 27 is electrically connected to the liquid crystal display panel 1 and the surface light source 9 to control them. The surface light source 9 emits first and second illumination lights toward the liquid crystal display device 1.

The first illumination light has a high front light intensity exiting in a direction parallel to a normal line (hereinafter referred to as a normal direction) of the liquid crystal display device 1, a predetermined spread angle range, and high directivity in a direction of the normal line. The second illumination light has a maximum value of an exit light intensity present in an oblique direction inclined at a predetermined angle with respect to the normal line of the surface light source and a spread angle range wider than that of the first illumination light.

Although an internal structure is not shown, the liquid crystal display device 1 has: a pair of transparent substrates 2 and 3 that are joined through a frame-like sealing material 4 surrounding the screen region 1a. Transparent electrodes are provided on opposed inner surfaces of the substrates 2 and 3 and form the plurality of pixels aligned in a matrix form based on regions facing each other. A liquid crystal layer is provided in a region surrounded by the sealing material 4 between the pair of substrates 2 and 3. A pair of polarizing plates 5 and 6 are respectively arranged on outer sides of the pair of substrates 2 and 3. A retardation plate 7 is arranged between one of the pair of substrates 2 and 3, e.g., the observation-side or second substrate 3 and the polarizing plate 6 on this side to increase contrast of display.

This liquid crystal display device 1 is an active matrix liquid crystal display device having a structure in which a plurality of pixel electrodes are arranged in a matrix form along row and column directions on the inner surface of one substrate, e.g., the pixel or first substrate 2 on the opposite side of the observation side, and a single-film-like opposed electrode facing an arrangement region of the plurality of pixel electrodes is provided on the inner surface of the second substrate 3. A plurality of active elements formed of TFTs respectively connected with the plurality of pixel electrodes, a plurality of scanning lines that supply gate signals to the TFTs in respective rows, and a plurality of data lines that supply data signals to the TFTs in respective columns are provided on the inner surface of the pixel electrode 2.

The pixel substrate 2 has a driver mounting portion 2a that extends toward the outside of the opposed substrate 3. The plurality of gate lines and data lines are electrically connected with a display driver 8 formed of an LSI mounted on the driver mounting portion 2a.

Alignment films are provided on the inner surfaces of the pair of substrates 2 and 3 to cover the electrodes. Liquid crystal molecules in the liquid crystal layer are aligned in an alignment state specified by the alignment films between the pair of substrates 2 and 3.

This liquid crystal display device 1 is of a liquid crystal display device that is one of a TN or an STN type in which liquid crystal molecules are twist-aligned, a homeotropic alignment type in which liquid crystal molecules are substantially homeotropically aligned with respect to the surfaces of the substrates 2 and 3, and a homogeneous alignment type in which liquid crystal molecules are aligned in substantially parallel to the surfaces of the substrates 2 and 3 without being bend-aligned, or a liquid crystal display device using a ferroelectric or an antiferroelectric liquid crystal. Further, the pair of polarizing plates 5 and 6 are arranged in such a manner that transmission axes thereof face a direction along which contrast of display by the liquid crystal display device is increased.

This liquid crystal display device 1 is not restricted to a vertical electric field control type that generates a vertical electric field (an electric field in a thickness direction of the liquid crystal layer) between the electrodes provided on the inner surfaces of the substrates 2 and 3 to change an alignment state of the liquid crystal molecules. It may by a lateral electric field control type by which, e.g., a first and a second electrodes each having a comb-like shape that form a plurality of pixels are provided on the inner surface of one of the substrates 2 and 3 and a lateral electric field (an electric field along the substrate surfaces) is generated between these electrodes to change an alignment state of the liquid crystal molecules.

The liquid crystal display device 1 may be a normally white mode display device or a normally black mode display device.

The surface light source 9 arranged on the opposite side of the observation side of the liquid crystal display device 1 is constituted of an optical deflecting means or unit 10, a first light-emitting element 25a, and two second light-emitting elements 25b and 25c. The optical deflecting means 10 is formed in substantially parallel with a lateral direction (a lateral direction in FIG. 1) of the liquid crystal display panel 1 on a side corresponding to one of upper and lower sides (an upper side or a lower side in FIG. 1) of the screen of the liquid crystal display device 1 as seen from an observer. The optical deflecting unit 10 includes a light guide plate 11 of a rectangular shape that has a light incidence facet or side face 12 from which light enters, a light exit surface or front face 13 crossing the light incidence facet 12, and an opposed surface or rear face facing the light exit surface. A plurality of arc-like inclined surfaces 14 of different radii are obliquely formed on the front or rear face of the light guide plate (in this embodiment, rear surface). The arc-like inclined surfaces are extended along an arc forming a part of a concentric circle having a substantially central point. That is, the arc-like inclined surfaces have a common central point. The common central point corresponds a center or central position 12a of a side crossing the light exit surface and front face 13 in a longitudinal direction or width direction. The arc-like inclined surfaces are inclined against the front surface 13 of the guide plate at a substantially equal angle. These inclined surfaces 14 change a direction of light that has entered from the light incidence facet 12 so that this light exits toward the liquid crystal display panel 1 side, from the front surface 13. The first or center light-emitting element 25a is arranged to face the central position 12a of the light incidence facet 12 of the light guide plate 11, and allows light spreading in a radial pattern from a center of curvature (the central position 12a) of the arc-like inclined surfaces 14 to exit toward the light incidence facet 12 of the light guide plate 11. Two second or side light-emitting elements 25b and 25c are arranged at positions 12b and 12c separated from the central position 12a of the light incidence facet 12 of the light guide plate 11 by a substantially equal distance in the lateral direction or width direction of the light incidence facet 12. The side emitters 25b and 25c allow light spreading in a radial pattern from the positions 12b and 12c separated from the center of curvature of the arc-like inclined surfaces 14 by a predetermined distance to exit toward the light incidence facet 12 of the optical deflecting means 10.

In the surface light source 9 according to this embodiment, the second light-emitting elements 25b and 25c are respectively arranged at the two positions 12b and 12c separated from the central position 12a of the light incidence facet 12 of the optical deflecting means 10 by the equal distance in the length direction (the lateral direction of the upper side) of the light incidence facet 12 while having a position of the first light-emitting element 25a at the center.

When the first light-emitting element 25a is turned on, this surface light source 9 emits toward the liquid crystal display device 1 first illumination light that has a maximum value of an exit light intensity present, in a direction parallel to a normal line of the surface light source (a normal line of the liquid crystal display device 1), a predetermined spread angle range, and strong directivity in a direction of the normal line. Furthermore, when the second light-emitting elements 25b and 25c are turned on, the surface light source 9 emits toward the liquid crystal display device 1 second illumination light that has a maximum value of an exit light intensity present in an oblique direction inclined at a predetermined angle with respect to the normal line of the surface light source 9, and a spread angle range wider than that of the first illumination light.

Figure 2:
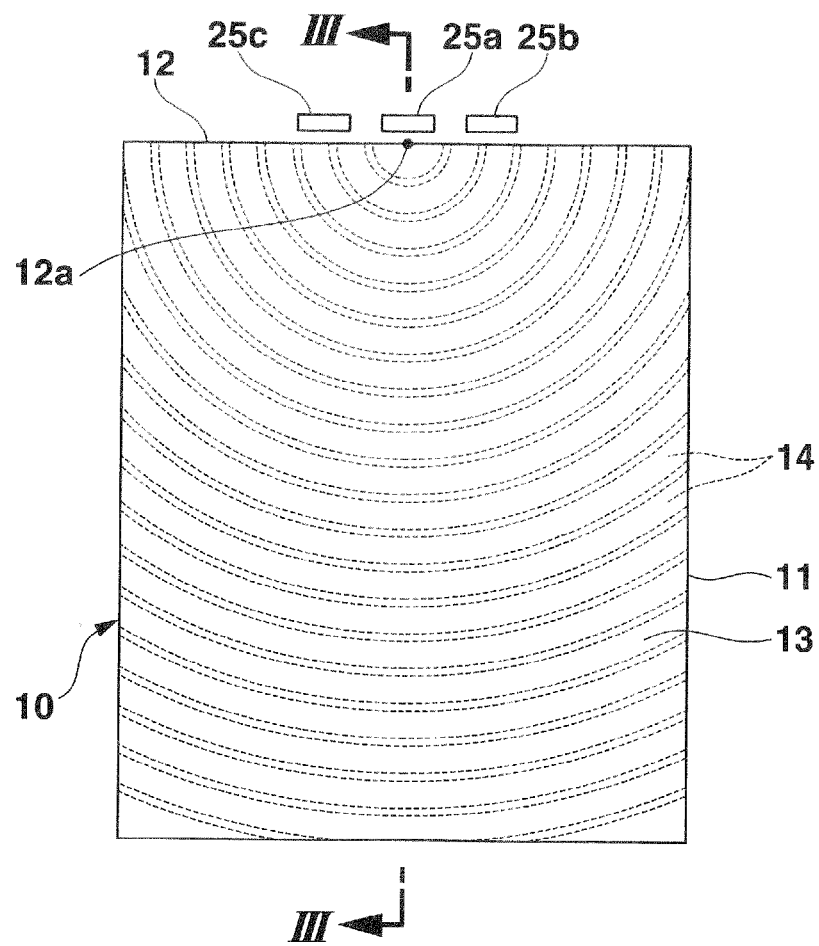
FIG. 2 is a front view seen from an exit side of a surface light source in the liquid crystal display apparatus.
Figure 3:
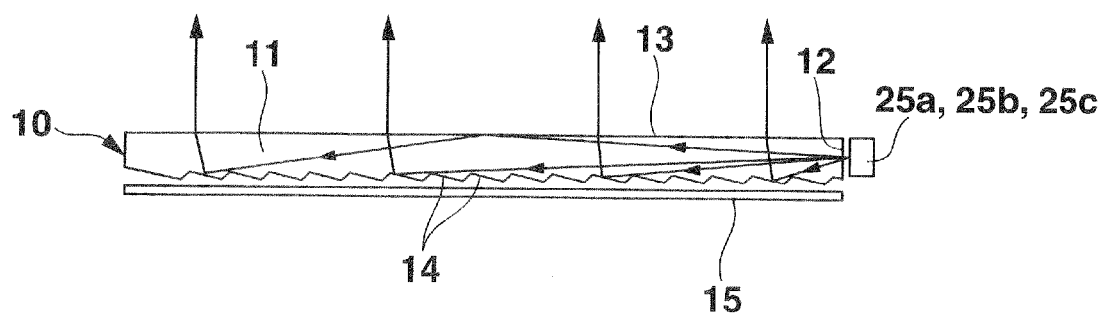
FIG. 3 is a cross-sectional view taken along a line III-III in FIG. 2.

FIG. 2 is a front view seen from an exit surface side of the surface light source 9, and FIG. 3 is a cross-sectional view taken along a line III-III in FIG. 2. As described above, the optical deflecting means 10 includes the light guide plate 11. The light guide plate 11 is made of, for example, acrylic resin, includes the light incidence facet 12 corresponding to that a facet of the liquid crystal display device 1 on the upper side of a peripheral surface of the transparent member 11, and allows light to enter therefrom. The light exit surface 13 is formed on the plate surface of the transparent plate 11 facing the liquid crystal display device 1, and allows light that has entered from the light incidence facet 12 to exit therefrom. The plurality of arc-like inclined surfaces 14 are concentrically formed on the plate surface on the opposite side of the transparent plate 11, along a semicircle having the central position 12a of the light incidence facet 12 in the length direction (the lateral direction in FIG. 2) at the center, and inclined at the substantially equal angle with respect to the radial direction. In this light guide plate 11, light that has entered from the light incidence facet 12 is reflected on the plurality of arc-like inclined surfaces 14 to change a direction of this light, so that the light exits from the light exit surface 13 toward the liquid crystal display device 1.

The plurality of arc-like inclined surfaces 14 of the light guide plate 11 are made of inclined surfaces that are inclined at a predetermined angle in such a manner that their reflection surfaces face the center of the semicircle, and concentrically formed with a pitch substantially equal to or smaller than a pixel pitch of the liquid crystal display device 1.

In this light guide plate 11, light that has entered from its light incidence facet 12 is internally reflected (total reflection on an interface with respect to outside air) on the arc-like inclined surfaces 14 to change its direction, and the light exits from the light exit surface 13 toward the liquid crystal display device 1 as indicated by arrows in FIG. 3. The inclination angle of the arc-like inclined surfaces 14 is set in such a manner that light having an intensity distribution in which peak of an exit light intensity is present in the normal line direction of the liquid crystal display device 1 exits from the exit surface 13 of the light guide plate 11 when the light spreading in a radial pattern in a direction along a plane substantially parallel with the plate surface of the light guide plate enters from the center of curvature of the arc-like inclined surfaces 14.

In this embodiment, a reflection plate 15 is arranged on the rear side of the light guide plate 11 (an outer side of the surface on which the arc-like deflection surfaces 14 are formed). Of light that has entered from the incidence facet 12 of the light guide plate 11, the reflection plate 15 reflects light leaking on the rear side of the light guide plate 11 through an interface between the arc-like inclined surfaces 14 and outside air.

Although structures are not shown, the first and the second light-emitting elements 25a, 25b, and 25c may be solid light-emitting elements obtained by molding LEDs (light-emitting diodes) by using a transparent resin. Each of these elements has preferably a lens section on an exit side thereof. The lens section radiates exit light from a light emission point of the LED in a direction along a plane substantially parallel with the plate surface of the light guide plate 11.

The first light-emitting element 25a is arranged in such a manner that a light emission point of the LED thereof faces the center of curvature (the central position or point 12a in FIG. 4A) of the arc-like inclined surfaces 14. The two second light-emitting elements 25b and 25c are arranged in such a manner that light emission points of the LEDs thereof respectively face the two points 12b and 12c (FIG. 4B) separated from the center of curvature of the arc-like inclined surfaces 14 by the equal distance in the length direction of the light incidence facet 12 of the light guide plate 11.

Figure 4A:
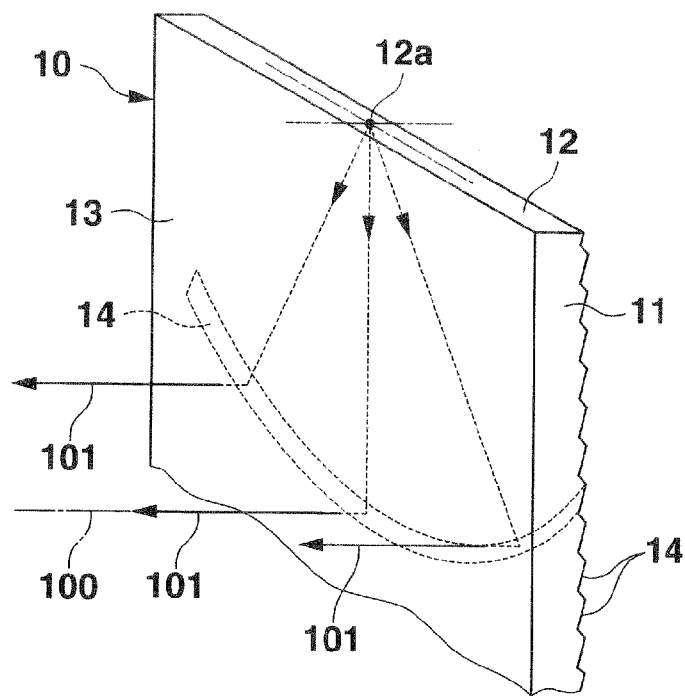
Figure 4B:
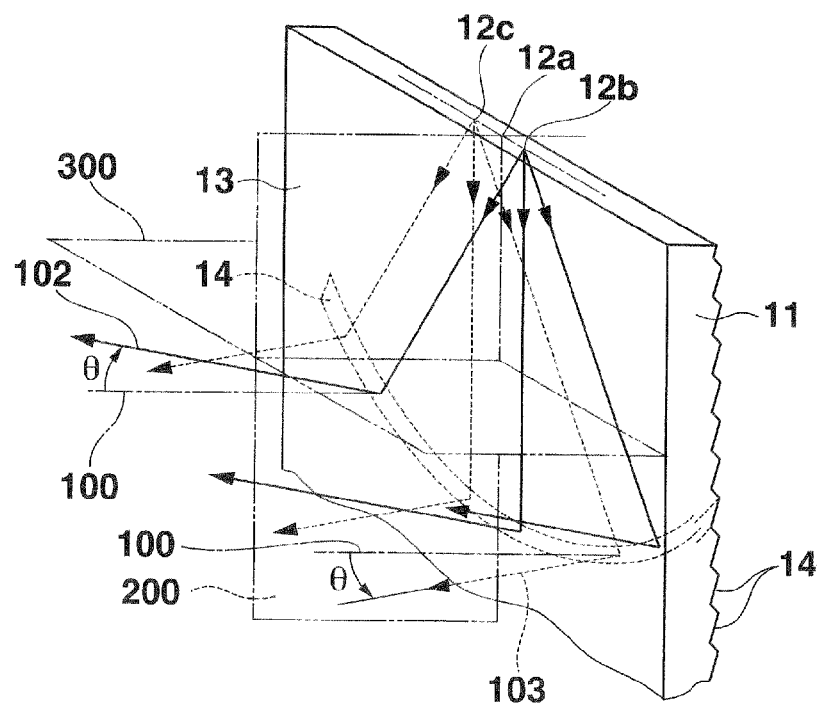

FIGS. 4A and 4B are light ray views respectively showing how light exiting from the light guide plate 11 travels when the first light-emitting element 25a of the surface light source 9 is turned on and when the second light-emitting elements 25b and 25c are turned on. FIG. 4A shows exit light rays when the first light-emitting element 25a is turned on, and FIG. 4B shows exit light rays when the second light-emitting elements 25b and 25c are turned on.

As shown in FIG. 4A, when the first light-emitting element 25a turns on, light (rays) that has been emitted from this first light-emitting element 25a and entered the light guide plate 11 from the light incidence facet 12 thereof travels from the center of curvature 12a of the arc-like inclined surfaces 14 in a direction radially extending along a plane substantially parallel with the plate surfaces of the light guide plate 11, and this light is internally reflected by the arc-like inclined surfaces 14 to change its direction and exits from the exit surface 13 of the light guide plate 11 in a normal line direction 100 of the liquid crystal display device 1.

Furthermore, as shown in FIG. 4B, when the two second light-emitting elements 25b and 25c turn on, each light that has emitted from these second light-emitting elements 25b and 25c and entered the light guide plate 11 from the incidence facet 12 thereof travels in a direction radially extending along a plane substantially parallel with the plate surfaces of the light guide plate 11 with the two points 12b and 12c separated from, the center of curvature 12a of the arc-like inclined surfaces 14 by the equal distance being determined as the center, is internally reflected by the arc-like inclined surfaces 14 to change it direction, and exits from the light exit surface 13 of the light guide plate 11 in each of directions inclined toward one direction and the opposite direction with respect to the normal line direction 100 of the liquid crystal display device 1 at an angle θ corresponding to a curvature radius of the arc-like inclined surfaces 14 and a distance between the center of curvature 12a and each of the points 12b and 12c.

That is, as shown in FIG. 4B, a plane perpendicular to each of the light exit surface 13 and the light incidence facet 12 is determined as a vertical reference plane 200 and a plane that includes a normal line of the light exit surface and is perpendicular to the vertical reference plane 200 is determined as a horizontal reference plane 300. At this time, light exiting from one of the second light-emitting elements 25b and 25c, i.e., the right light-emitting element 25b as seen from the observation side of the liquid crystal display device 1 is internally reflected by the arc-like inclined surfaces 14 in a direction that is inclined to the left side with respect the vertical reference plane 200 as seen from the observation side at the angle θ corresponding to the distance from the center of curvature and is parallel to a plane perpendicular to the horizontal reference plane 300 (a direction inclined to the left side with respect to the normal line direction 100 at the angle θ), and exits as second illumination light 102 (indicated by a solid line in FIG. 4B) from the light exit surface 13. Light exiting from the left light-emitting element 25c as seen from the observation side is internally reflected by the arc-like inclined surfaces 14 in a direction that is inclined to the right side with respect to the vertical reference plane 200 as seen from the observation side at the angle θ corresponding to the distance from the center of curvature and is parallel with a plane perpendicular to the horizontal reference plane 300 (a direction inclined to the right side with respect to the normal line direction 100 at the angle θ), and exits as second illumination light 103 (indicated by a broken line in FIG. 4B) from the light exit surface 13.

As described above, when the first light-emitting element 25a turns on, the surface light source 9 emits toward the liquid crystal display device 1 the first illumination light 101 that has the highest intensity of front light exiting in the normal line direction 100 of the liquid crystal display device and directivity with a narrow spread angle, i.e., the first illumination light that has an intensity distribution in which an exit light intensity peak is present in the normal line direction 100 and an exit angle range is narrow. Moreover, when the second light-emitting elements 25b and 25c turn on, the surface light source emit toward the liquid crystal display device 1 the second illumination lights 102 and 103 that demonstrate maximum values of oblique lights exiting in directions inclined to one side and the opposite side with respect to the normal line direction 100 and have an intensity distribution with a wide spread angle, i.e., the second illumination lights 102 and 103 that have the maximum values of exit light intensities in directions inclined to the left side and the right side in FIG. 4B with respect to the normal line direction 100 at the angle θ and have the intensity distributions with the exit angle range wider than that of the first illumination light.

In this embodiment, the incidence facet 12 of the light guide plate 11 is arranged to face one edge side (an upper edge side in the drawing) in the vertical direction of the screen of the liquid crystal display device 1. Therefore, when the two second light-emitting elements 25b and 25c are turned on, the surface light source 9 emits toward the liquid crystal display device 1 the second illumination lights 102 and 103 having the exit light spread angles in the directions inclined to the left side and the right side of the screen with respect to the vertical reference plane 200.

Additionally, as shown in FIG. 1, the surface light source 9 further includes an anisotropic diffusion plate 26 that is arranged on the exit side of the light guide plate 11 and diffuses light on a plane inclined with respect to the vertical reference plane 200 including the normal line direction 100 of the liquid crystal display device 1 and light in a direction parallel to this plane of lights exiting from the exit surface 13 of the light guide plate 11.

The anisotropic diffusion plate 26 is a diffusion plate that scatters light exiting from the light exit surface 13 in a predetermined angle range in a direction inclined at a predetermined angle with respect to the vertical reference plane on the horizontal reference plane. For example, this is Lumisty (an article name) manufactured by Sumitomo Chemical Co. Ltd., and this embodiment adopts the diffusion plate having characteristics of diffusing light that enters from a diffusing direction parallel to planes inclined to one side and the opposite side with respect to a plane including the normal line direction of the diffusion plate at an angle in a range of 30° to 80°.

This anisotropic diffusion plate 26 is arranged to match its diffusing direction with the lateral direction as seen from the observation side of the liquid crystal display device 1 and diffuse light in directions inclined to the left side and the right side of the screen of the liquid crystal display device 1.

FIGS. 5A to 5C are intensity distribution charts of illumination light from the surface light source 9 including the anisotropic diffusion plate 26. FIG. 5A shows an intensity distribution of irradiation light when only the first light-emitting element 25a is turned on, FIG. 5B shows an intensity distribution of irradiation light when only the second light-emitting elements 25b and 25c are turned on, and FIG. 5C shows an intensity distribution of irradiation light when the first and the second light-emitting elements 25a, 25b, and 25c are simultaneously turned on. As shown in these figures, a negative angle is an inclination angle to the left side with respect to the normal line direction 100 (a direction of 0°) of the liquid crystal display device 1 as seen from the observation side, and a positive angle is an inclination angle to the right side with respect to the normal line direction 100 as seen from the observation side.

As shown in FIG. 5A, the surface light source 9, by turning on of the first light-emitting element 25a, emits the first illumination light 101 that has a peak of an exit light intensity in the normal line direction 100 of the liquid crystal display device 1, especially a high intensity of front light in a narrow angle range of approximately −20° to 20°. It is preferable for the first illumination light 101 to have an intensity distribution in which an intensity of front light in a narrow angle range of −10° to 10° is high and an exit light intensity of oblique light out of this angle range is not greater than approximately 10% of the intensity of the front light. Further, the surface light source 9, by turning on of the second light-emitting elements 25b and 25c emits the second illumination lights 102 and 103 that have an intensity distribution in which peaks of the exit light intensity are present in directions inclined with respect to the normal line direction 100 at approximately −20° and approximately 20° and the exit light intensity in directions further inclined beyond the respective peak directions is approximately ⅔ to ⅓ of the exit light intensity in the peak directions and close to a flat shape in a wide angle range of approximately −80° to approximately 80°.

Furthermore, as shown in FIG. 5C, the surface light source 9 by simultaneously turning on the first and the second light-emitting elements 25a, 25b, and 25c to emit combined illumination light 104 in which the first illumination light 101 and the second illumination lights 102 and 103 are superimposed and which has an intensity distribution in which a peak of the exit light intensity is present in the normal line direction 100 of the liquid crystal display device 1 and the exit light intensity in directions inclined with respect to the normal line direction is approximately ⅔ to ⅕ of the exit light intensity in the peak direction in a wide angle range of approximately −80° to 80°.

This surface light source can control lighting the first and the second light-emitting elements 25a, 25b, and 25c to selectively emit illumination light having a wide spread angle and highly directive light having a narrow spread angle.

FIG. 6 is an exit light ray view at the time of narrow-viewing angle display by the liquid crystal display apparatus. In this case, the first light-emitting element 25a in the surface light source 9 is turned on to emit the first illumination light 101 having such an intensity distribution as shown in FIG. 5A from the surface light source 9 toward the liquid crystal display device 1. Therefore, a display image corresponding to the display image data cannot be visually recognized from a direction inclined with respect to the front direction. Accordingly, narrow viewing angle display in which a viewing angle of the display image is restricted to the front direction can be performed.

FIG. 7 is an exit light ray view at the time of wide-viewing angle display by the liquid crystal display apparatus. In this case, the first and the second light-emitting elements 25a, 25b, and 25c of the surface light source 9 are simultaneously turned on so that the combined illumination light 104 having such an intensity distribution as shown in FIG. 5C is emitted from the surface light source 9 toward the liquid crystal display device 1. Therefore, wide-viewing angle display that allows observation of a display image corresponding to an image signal can be performed in both the front direction and the directions inclined to the left side and the right side with respect to the front direction. Further, this liquid crystal display apparatus can be obtained at a low cost.

As described above, the surface light source according to this embodiment includes the first and second light sources that emit light, and an optical deflection element. The optical deflection element converts light emitted from the first light source into the first illumination light that has a maximum value of an exit light intensity present in a direction parallel to the normal line of the surface light source, a predetermined spread angle range, and high directivity in the normal line direction, and allows the converted light to exit therefrom. The optical deflection element further converts light emitted from each second light source into the second illumination light that has a maximum value of an exit light intensity in an oblique direction inclined at a predetermined angle with respect to the normal line of the surface light source and a spread angle range wider than that of the first illumination light, and allows the converted light to exit therefrom In this surface light source, it is preferable for the optical deflection element to include the light guide plate constituted of the light incidence facet, the light exit surface, an opposed surface, and at least one reflection surface. The light incidence facet is provided on one facet of a tabular transparent member and allows lights emitted from the first light source and the second light sources arranged with a predetermined gap formed therebetween to enter therefrom. The light exit surface is provided on a plate surface crossing the light incidence facet of the plate-like transparent member, and allows light that has entered from the light incidence facet and has been led to the inside of the transparent member to exit in a predetermined direction. The opposed surface is provided on the other plate surface facing the light exit surface. The reflection surface is provided on one of the light exit surface and the opposed surface, deflects light emitted from the first light source to exit from the light exit surface as the first illumination light, and deflects light emitted from each second light source to exit from the light exit surface as the second illumination light.

In this surface light source, the following structure is preferable. That is, the first light source is arranged at a substantially central position of the light incidence facet of the light guide plate in a length direction of a side crossing the light exit surface. The second light sources are respectively arranged on at least two positions separated on both sides from the central position of the incidence facet by a predetermined distance. The reflection surface of the light guide plate is formed of the plurality of concentrically arranged arc-like inclined surfaces that have an arc-like shape along a pare of a circle having the central position of the incidence end facet where the first light source is arranged at the center. Assuming that a plane perpendicular to each of the light exit surface and the light incidence facet is a vertical reference surface and a plane that includes a normal line of the light exit surface and is perpendicular to the vertical reference surface is a horizontal reference plane, the arc-like inclined surfaces reflect light from the first light source that has entered from the central position of the light incidence facet in a direction substantially parallel to the normal line of the light exit surface, and reflect two lights from the second light sources that have entered from the at least two positions separated on both sides from the central position of the incidence facet by a predetermined distance in directions parallel to respective planes that are inclined with, respect to the vertical reference surface at each angle corresponding to the distance from the central position and perpendicular to the horizontal reference plane. In this case, in is desirable for the arc-like inclined surfaces are formed on the opposed surface or rear face of the light guide plate. Furthermore, it is desirable that the arc-like inclined surfaces include a prism sheet that is formed on the light exit surface of the light guide plate, arranged to face the outer side of the light exit surface, and condenses light exiting from the light exit surface.

Moreover, in this surface light source, it is preferable that the optical deflection element includes the light guide plate having the light incidence facet, the light exit surface, the opposed surface, and the plurality of arc-like inclined surfaces. The light incidence facet is provided on one facet of a rectangular transparent plate and allows lights emitted from the first light source and the second light sources arranged with predetermined distances provided therebetween to enter therefrom. The light exit surface is provided on an upper plate surface crossing the light incidence facet of the transparent guide plate, and allows light that has entered from the light incidence facet and has been led to the inside of the guide plate to exit in a predetermined direction. The lower opposed surface is provided on the other plate surface facing the light exit surface. The plurality of arc-like inclined surfaces are provided on one of the light exit surface and the opposed surface, form an arc-like shape along a part of a circle having a substantially central position of the light incidence facet where the first light source is arranged in a length direction of a side thereof crossing the light exit surface at the center, are concentrically arranged with the central position at the center, and reflect light from the first light source in a direction substantially parallel with a normal line of the light exit surface.

Additionally, it is preferable for this surface light source to further include the reflection plate on the outer side of the opposed surface of the light guide plate. The reflection plate reflects light transmitted through the light guide plate to exit from the opposed surface toward the opposed surface, and returns this light to the inside of the light guide plate.

Further, it is preferable for this surface light source to further include the anisotropic diffusion plate. The anisotropic diffusion plate is arranged to face the outer side of the light exit surface of the light guide plate, and scatters light exiting from the light exist, surface in a predetermined angle range along directions respectively inclined on the horizontal reference plane with respect to the vertical reference plane at predetermined angles. According to this structure, a viewing angle of the wide-viewing angle display can be further widened.

In this surface light source, it is preferable, that the optical deflection element converts light emitted from the first light source into the first illumination light having strong directivity by which an intensity of light exiting in oblique directions inclined on both sides with respect to the normal line of the surface light source at an angle of 20° becomes 10% or below of an intensity of light exiting in a direction parallel to the normal line, and allows the converted light, to exit. More desirably, the optical deflection element converts lights emitted from the second light sources into the second illumination lights each having an intensity distribution where a maximum value of an exit light intensity exists in an oblique direction with respect to the normal line of the surface light source at an inclination angle by which an exit light intensity of the first illumination light becomes 10% or below of the maximum value thereof, and allows the converted light to exit therefrom.

Furthermore, the liquid crystal apparatus according to this embodiment includes the liquid crystal display device, and the surface light source arranged on the opposite side of the observation, side of the liquid crystal display device. The liquid crystal display device has the screen region where the plurality of pixels that control transmission of light are arranged in a matrix form. An image signal is applied to each of the plurality of pixels, thereby displaying an image corresponding to the pixel signal. The surface light source has the first and the second light sources that emit lights, and the optical deflection element. The optical deflection element converts light emitted from the first light source into the first illumination light that has a maximum value of an exit light intensity present in a direction parallel to the normal line of the surface light source, a predetermined spread angle range, and strong directivity in the normal line direction, and allows the converted light to exit therefrom. The optical deflection element further converts light emitted from each second light source into the second illumination light that has a maximum value of an exit light intensity in an oblique direction inclined at a predetermined angle with respect to the normal line of the surface light source and a spread angle range wider than that of the first illumination light, and allows the converted light to exit therefrom. The liquid crystal display apparatus has a simple structure, and can be readily manufactured.

In this liquid crystal display apparatus, the optical deflection element includes the light guide plate having the light incidence facet, the light exit surface, the opposed surface, and the plurality of arc-like inclined surfaces. The light incidence facet is provided on one facet of a rectangular transparent plate, and allows lights emitted from the first light source and the second light sources arranged with predetermined gaps formed therebetween to enter therefrom. The light exit surface is provided on the plate surface crossing the light: incidence facet of the rectangular transparent plate, and allows light that has entered from the light incidence facet and has been led to the inside of the transparent plate to exit in a predetermined direction. The opposed surface is provided on the other plate surface facing the light exit surface. The plurality of arc-like inclined surfaces are provided on the light exit surface or the opposed surface, form an arc shape along a part of a circle with a substantially central position of the light incidence facet where the first light source is arranged in a length direction of a side thereof crossing the light exit surface at the center, are concentrically arranged with the central position at the center, and reflect light from the first light source in a direction substantially parallel to the normal line of the light exit surface. The first light source may be arranged at the central position of the light incidence facet of the light guide plate, and the second light sources may be respectively arranged on at least two positions separated on both sides from the central position of the incidence facet by a predetermined distance.

Moreover, it is preferable to form the arc-like inclined surfaces of the light guide plate with an inclination angle. According to this structure, assuming that a plane perpendicular to each of the light exit surface and the light incidence facet, is a vertical reference plane and a plane that includes a normal line of the light exit surface and is perpendicular to the vertical reference plan is a horizontal reference plane, light from the first light source that has entered from the central position of the light incidence fact is reflected in a direction substantially parallel to the normal line of the light exit surface. Additionally, two lights from the second light sources that have entered from two positions separated on both sides from the central position of the incidence facet by the predetermined distance are reflected in directions that are inclined with respect to the vertical reference plane at each angle corresponding to the distance from the center and substantially parallel to each plane perpendicular to the horizontal reference plane.

Further, it is preferable to configure the optical deflection element in the following manner. That is, the optical deflection element converts light emitted from the first light source into the first illumination light having strong directivity by which an intensity of exit light in an oblique direction inclined on each of both sides with respect to the normal line of the surface light source at an angle of 20° becomes 10% of an intensity of exit light in a direction parallel to the normal line, and allows the converted light to exit therefrom. Furthermore, the optical deflection element converts lights emitted from the second light source into second illumination lights having an intensity distribution in which a maximum value of an intensity of exit light exits in an oblique direction having an inclination angle by which an exit light intensity of the first illumination light becomes 10% or below a maximum value thereof with respect to the normal line of the surface light source, and allows the converted light to exit therefrom.

As shown in FIG. 1, the controller 27 that drives the liquid crystal display device 1 and the surface light source 9 is constituted of a display drive circuit 27a, a light source drive circuit 27b, and a control circuit 27c. The display drive circuit 27a supplies an image signal Sd corresponding to image data fed from the outside to each pixel in the liquid crystal display device 1. In accordance with a viewing field selection signal supplied from the outside, the light source drive circuit 27b turns on the first light-emitting element 25a of the surface light source 9 in synchronization with application of the image signal when a viewing field selection signal that is used to select narrow-viewing angle display is input, and simultaneously turns on the first light-emitting element 25a and the two second light emitting elements 25b and 25c of the surface light source 9 in synchronization with application of the image signal when a viewing angle selection signal that is used to select wide-viewing angle display is input. The control circuit 27c controls the display drive circuit 27a and the light source drive circuit 27b.

The narrow-viewing angle selection signal is supplied to the controller 27 from a circuit section of an electronic device like a mobile phone having the liquid crystal display apparatus mounted thereon based on, e.g., an operation of a viewing angle selection key provided in the electronic device.

FIGS. 8A and 8B are driving sequence diagram of the liquid crystal display device 1 and the surface light source 9 in case of a field sequential liquid crystal display apparatus in which the liquid crystal display device 1 is constituted of a display device including no color filter and the first and the second light-emitting elements 25a, 25b, and 25c of the surface light source 9 are respectively constituted of three color LEDs of red, green, and blue. FIG. 8A shows a driving sequence at the time of narrow-viewing angle display, and FIG. 8B shows driving sequence at the time of wide-viewing angle display.

In case of this field sequential liquid crystal display apparatus, one frame 1F is divided into three fields $f_1$ to $f_3$. At the time of narrow-viewing angle display, as shown in FIG. 8A, an image signal Sr of a red unit color, an image signal Sg of a green unit color, and an image signal Sb of a blue unit color are sequentially applied to the respective pixels in the liquid crystal display device 1 in accordance with the respective first to third fields $f_1$, $f_2$, and $f_3$. When the red, green, and blue LEDs of the first light-emitting element 25a are sequentially selectively turned on in synchronization with application of these image signals Sr, Sg, and Sb of the respective unit colors, the surface light source 9 sequentially emits red first illumination light Lr1, green first illumination light Lg1, and blue first illumination light Lb1.

At the time of wide-viewing angle display, as shown in FIG. 8B, the image signal Sr of the red unit color, the image signal Sg of the green unit color, and the image signal Sb of the blue unit color are sequentially applied to the respective pixels in the liquid crystal display device 1 in accordance with the first to third respective fields $f_1$, $f_2$, and $f_3$. The LEDs having the same colors in the first and the second light-emitting elements 25a, 25b, and 25c are simultaneously turned on in synchronization with application of these image signals Sr, Sg, and Sb having the respective unit colors, thereby sequentially emitting red first and second illumination lights Lr1 and Lr2, green first and second illumination lights Lg1 and Lg2, and blue first and second illumination lights Lb1 and Lb2.

This liquid crystal display apparatus may be a liquid crystal display apparatus in which the three color filters of red, green, and blue facing the plurality of pixels are provided in the liquid crystal display device 1 and the white first and second illumination lights are emitted from the surface light source 9. In this case, the image signals Sr, Sg, and Sb of the respective colors, i.e., red, green, and blue are applied to the respective pixels corresponding to the red, green, and blue color filters in the liquid crystal display device 1 in accordance with each frame, and the surface light source 9 emits the white first illumination lights Lr1, Lg1, and Lb1 at the time of narrow-viewing angle display, whilst the surface light source 9 emits the white first illumination lights Lr1, Lg1, and Lb1 and the second illumination lights Lr2, Lg2, and Lb2 at the time of wide-viewing angle display.

In the liquid crystal display apparatus according to this embodiment, the controller 27 applies the display image signal Sd to each pixel in the liquid crystal display device 1 to turn on the first light-emitting element 25a of the surface light source 9 in synchronization with application of the image signal Sd in this manner. As a result, the surface light source 9 emits the first illumination light 101 having the high directivity in the normal line direction of the liquid crystal display device 1, thereby effecting narrow-viewing angle display. Further, the display image signal Sd is applied to each pixel in the liquid crystal display device 1 to simultaneously turn on the first light-emitting element 25a and the two second light-emitting elements 25b and 25c in synchronization with application of the image signal Sd. As a result, the surface light source 9 emits the combined illumination light 104 obtained by superimposing the first illumination light 101 and the second illumination lights 102 and 103 having the directivity in the oblique direction to perform wide-viewing angle display. As a result, a viewing angle of display can be controlled to both a narrow viewing angle and a wide viewing angle.

In the narrow-viewing angle display, the liquid crystal display apparatus according to the first embodiment turns on the first light-emitting element 25a to emit the first illumination light 101 having the directivity of a spread angle narrow in the normal direction from the surface light source 9. Alternatively, in order to effect the narrow-viewing angle display, as shown in FIG. 8A, an image signal and a fixed image signal Sfix corresponding to a fixed image having a pre-registered pattern may be alternately applied to each pixel in the liquid crystal display device 1 to turn on the first light-emitting element 25a of the surface light source 9 in synchronization with application of the image signal and turn on the second light-emitting elements 25b and 25c of the surface light source 9 in synchronization with application of the fixed image signal Sfix.

Furthermore, in the liquid crystal display apparatus according to the first embodiment, in the wide-viewing angle display, the first and the second light-emitting elements 25a, 25b, and 25c are simultaneously turned on to simultaneously emit the first illumination light 101 and the second illumination lights 102 and 103 having the directivity in the oblique directions from the surface light source 9. However, the wide/narrow-viewing angle display may be carried out by applying the image signal to each pixel in the liquid crystal display device 1 to alternately turn on the first light-emitting element 25a and the second light-emitting elements 25b and 25c in synchronization with application of the image signal.

Second Embodiment

FIGS. 9 to 13C show a second embodiment according to the present invention. FIG. 9 is a block circuit diagram of a controller 27 that drives a liquid crystal display device 1 and a surface light source 9.

In a liquid crystal display apparatus according to this embodiment, the controller 27 includes a fixed image data generating section 28, first and second image data memories 29 and 30, a memory write control section 31, a memory read control section 32, a light source drive section 33, and a drive control section 34. The fixed image data generating section 28 generates fixed image data corresponding to a pre-registered fixed image. The memory write control section 31 writes display image data corresponding to image data supplied from the outside into the first memory 29, and selectively writes the display image data and the fixed image data into the second memory 30 in accordance with a viewing angle selection signal. The memory read control section 32 alternately reads the image data written in the first memory 29 and the second memory 30 to be supplied to a data line drive section 8a of a display driver 8 mounted on the liquid crystal display device 1. The light source drive section 33 selectively turns on the first and second light-emitting elements 25a, 25b, and 25c in the surface light source 9. The drive control section 34 controls the memory write control section 31, the memory read control section 32, the light source drive section 33, and a scanning line drive section 8b of the display driver 8.

When a viewing angle selection signal that is used to select narrow-viewing angle display is input, the controller 27 writes the display image data into the first memory 29, and the fixed image data supplied from the fixed image data generating section 28 into the second memory 30. Then, in a period of one of two sub-frames obtained by dividing one frame required to display an image for one screen into two, the display image data is read from the first memory 29 to be supplied to the data line drive section 8a, and a display image signal corresponding to this display image data is applied to each pixel in the liquid crystal display device 1. Thus, the first light-emitting element 25a of the surface light source 9 is turned on in synchronization with supply of this image signal to each pixel. In a period of the other sub-frame, the fixed image data is read from the second memory 30 to be supplied to the data line drive section 8a, and a fixed image signal corresponding to this fixed image data is applied to each pixel in the liquid crystal display device 1. The second light-emitting elements 25b and 25c of the surface light source 9 are turned on in synchronization with supply of this fixed image signal to each pixel.

Further, when a viewing angle selection signal that is used to select wide-viewing angle display is input, the controller 27 writes display image data corresponding to the image signal into the first and second memories 29 and 30, reads the display image data from the first memory 29 to be supplied to the data line drive section 8a in the period of one of the two sub-frames, applies an image signal corresponding to this display image data to each pixel in the liquid crystal display device 1. The first light-emitting element 25a of the surface light source 9 is turned on in synchronization with supply of this image signal to each pixel. In the period of the other of the two sub-frames, the display image data read from the second memory 30 is supplied to the data line drive section, and an image signal corresponding to this display image data is applied to each pixel in the liquid crystal display device 1. The second light-emitting elements 25b and 25c of the surface light source 9 are turned on in synchronization with supply of this fixed image signal to each pixel.

FIGS. 10A and 10B are driving sequence diagrams of the liquid crystal display device 1 and the surface light source 9 when a field sequential liquid crystal display apparatus is used. FIG. 10A shows a driving sequence at the time of narrow-viewing angle display, and FIG. 10B shows a driving sequence at the time of wide-viewing angle display.

According to a driving method of this field sequential liquid crystal display apparatus, one frame 1F is divided into two sub-frames f1 and f2, and each of the sub-frames f1 and f2 is divided into three fields f11 to f13 and three fields f21 to f23. At the time of narrow-viewing angle display, as shown in FIG. 10A, an image signal Sr of a red unit color, an image signal Sg of a green unit color, and an image signal Sb of a blue unit color are sequentially applied to the respective pixels in the liquid crystal display device 1 in accordance with the first to third fields f11 to f13 that correspond to one of the respective sub-frames f1 and 12 obtained by dividing the one frame 1F into two, e.g., the first sub-frame f1. Red, green, and blue LEDs of the first light-emitting element 25a are selectively turned on in synchronization with application of these image signals Sr, Sg, and Sb of the respective unit colors so that the surface light source 9 sequentially emits first illumination lights 101 of red, green, and blue each having the intensity distribution shown in FIG. 5A. A fixed image signal Srfix of a red unit color, a fixed image signal Sgfix of a green unit color, and a fixed image signal Sgfix of a blue unit color are sequentially applied to the respective pixels in the liquid crystal display device 1 in accordance with the fourth to the sixth fields f21 to f23 of the last sub-frame 12 obtained by dividing the one frame 1F. Red, green, and blue LEDs of the second light-emitting elements 25b and 25c are selectively turned on in synchronization with application of these fixed image signals Sfix of the respective unit colors, thereby sequentially emitting the second illumination lights 102 and 103 of red, green, and blue having the intensity distribution shown in FIG. 5B from the surface light source 9.

At the time of wide-viewing angle display, as shown in FIG. 10B, the image signal Sr of the red unit color, the image signal Sg of the green unit color, and the image signal Sb of the blue unit color are sequentially applied to the respective pixels in the liquid crystal display device 1 in accordance with the first to third fields f11 to f13 of one of periods obtained by dividing the one frame into two, e.g., the first sub-frame f1. The surface light source 9 sequentially emits the first illumination lights 101 of red, green, and blue in synchronization with application of these image signals Sr, Sg, and Sb of the respective unit colors. The image signal Sr of the red unit color, the image signal Sg of the green unit color, and the image signal Sb of the blue unit color are sequentially applied to the respective pixels in the liquid crystal display device 1 in accordance with the fourth to the sixth fields f21 to f23 corresponding to the last sub-frame f2 obtained by dividing the one frame 1F. The surface light source 9 sequentially emirs the second illumination lights 102 and 103 of red, green, and blue in synchronization with application of these image signals Sr, Sg, and Sb of the respective unit colors.

It is to be noted that FIGS. 10A and 10B show the driving sequences for alternate execution of sequentially application of the image signals Sr, Sg, and Sb of the red, green, and blue unit colors and sequential application of the fixed image signals Sfix of the red, green, and blue unit colors. However, the present invention is not restricted thereto. For example, application of the image signal of one of the red, green, and blue unit colors and application of the fixed image signal of one of the red, green, and blue unit colors may be alternately carried out to emit the first illumination light 101 of the unit color of the image signal in synchronization with application of the image signal and emit the second illumination lights 102 and 103 of the unit color of the fixed image signal in synchronization with the fixed image signal.

FIGS. 11A and 11B are driving sequence diagrams of the liquid crystal display device 1 and the surface light source 9 when a liquid crystal display apparatus in which the liquid crystal display device 1 includes three color filters of red, green, and blue facing the plurality of pixels is used. FIG. 11A shows a driving sequence at the time of narrow-viewing angle display, and FIG. 11B shows a driving sequence at the time of wide-viewing angle display.

In case of this liquid crystal display apparatus, the one frame 1F is divided into two fields f1 and f2. At the time of narrow-viewing angle display, as shown in FIG. 11A, for example, in the first field f1, the image signals Srgb of the respective colors, i.e., red, green, and blue are applied to the respective pixels corresponding to the color filters of red, green, and blue in the liquid crystal display device 1. The surface light source 9 emits the white first illumination light 101 having the intensity distribution shown in FIG. 5A by turning on the first light-emitting element 25a in synchronization with application of the image signals Srgb. In the second field f2, the fixed image signals Sfix of the respective colors, i.e., red, green, and blue are applied to the respective pixels in the liquid crystal display device 1. The surface light source 9 emits the white second illumination lights 102 and 103 having the intensity distribution shown in FIG. 5B by turning on the second light-emitting elements 25b and 25c in synchronization with application of the fixed image signals Sfix.

Further, at the time of wide-viewing angle display, as shown in FIG. 11B, for example, in the first field f1, the image signals Srgb of the respective colors, i.e., red, green, and blue are applied to the pixels corresponding to the color filters of red, green, and blue in the liquid crystal display device 1. The surface light source 9 emits the white first illumination light 101 in synchronization with application of the image signals. In the second field f2, likewise, the image signals Srgb of the respective colors, i.e., red, green, and blue are applied to the pixels in the liquid crystal display device 1. The surface light source 9 emits the white second illumination lights 102 and 103 in synchronization with application of the image signals.

That is, the liquid crystal display apparatus according to this embodiment selectively performs continuous display of the display image and alternates display of the display image and the fixed image in the plurality of continuous fields f1 and f2 in accordance with the viewing angle selection signal. In synchronization with display of these images, the surface light source 9 emits the first illumination light 101 having the high directivity in the normal line direction 100 of the liquid crystal display device 1 in the field f1, thereby displaying the display image in the front direction. In the subsequent field f2, the surface light source 9 emits the second illumination lights 102 and 103 having the directivity in each oblique direction, thus selectively displaying the image corresponding to the selected image data and the fixed image.

Therefore, when the display image and the fixed image are alternately displayed in the plurality of continuous fields f1 and f2 as shown in FIG. 11A, the display image is observed from the front direction. However, since the first illumination light 101 has the high directivity in the front direction, the display image cannot be visually recognized from a direction inclined with respect to the front direction. Furthermore, since the fixed image having the pre-registered pattern is observed in the direction inclined with respect to the front direction, the display image formed by light leaking in the direction inclined with respect to the front direction is hidden by the fixed image, and hence the display image cannot be visually recognized at all, thus effecting narrow-viewing angle display restricting the viewing angle of the display image to the front direction.

FIGS. 12A to 12C show examples of respective observed images at the time of narrow-viewing angle display. FIG. 12A shows a display example as seen from the front direction, FIG. 12B shows a display example as seen from the left-inclined direction, and FIG. 12C shows a display example as seen from a direction inclined to the right side. Here, the example where a display image corresponding to the image data and a fixed image having a checked pattern are alternately displayed is shown.

It is to be noted that the fixed image having the checked pattern may be an image having a pattern in which rectangular patterns of a plurality of colors of yellow, magenta, cyan, and black based on red, green, and blue or mixed colors thereof are alternately aligned in the row direction and the column direction, or an image having a pattern in which rectangular patterns of white and black based on mixed colors of red, green, and blue are alternately aligned in the row direction and the column direction. Moreover, the fixed image is not restricted to the checked pattern, and it may be an image of a stripe form, a mark, a character or the like.

On the other hand, when the display image is continuously displayed in the plurality of continuous fields f1 and f2 as shown in FIG. 11B, the display image corresponding to the image data is alternately displayed, and it is possible to perform wide-viewing angle display that enables observation of the display image corresponding to the image signal from both the front direction and the directions inclined to the left side and the right side with respect to the front direction.

FIGS. 13A to 13C show examples of respective observed images at the time, of wide-viewing angle display. FIG. 13A shows a display example seen from the front direction, FIG. 13B shows a display example as seen from the left-inclined direction, and FIG. 13C shows a display example seen from the direction inclined to the right side.

As described above, in the liquid crystal display apparatus according to this embodiment, when narrow-viewing angle display is selected, the controller 27 alternately applies a display image signal and a fixed image signal corresponding to a fixed image having a pre-registered pattern to the respective pixels in the liquid crystal display device 1, turns on the first light-emitting element 25a of the surface light source 9 in synchronization with application of the image signal, and turns on the second light-emitting elements 25b and 25c of the surface light source 9 in synchronization with application of the fixed image signal. Therefore, a display image cannot be visually recognized from a direction inclined with respect to the front direction, and this image cannot be seen because it is hidden by a fixed image having a pattern corresponding to the fixed image data. Accordingly, it is possible to perform narrow-viewing angle display that effectively restricts a viewing angle of an image corresponding to the image signal to the front direction.

As mentioned above, the liquid crystal display apparatus according to this embodiment includes: the liquid crystal display device; the surface light source that has first and second light sources or light-emitting elements that emit lights, an optical deflection element arranged on an opposite side of an observation side of the liquid crystal display device; and the controller constituted of a display drive circuit and a light source drive circuit. The liquid crystal display device has a screen region in which the plurality of pixels that control transmission of light, are arranged in a matrix form. When an image signal is applied to each of the plurality of pixels, the liquid crystal display device displays an image corresponding to this image signal. The optical deflection element converts light emitted from the first light source into first illumination light having a maximum value of an exit light intensity present in a direction parallel to the normal line of the surface light source, a predetermined spread angle range, and high directivity in the normal line direction, and allows the converted light to exit therefrom. Further, the optical deflection element converts light emitted from each of the second light sources into second illumination light having a maximum value of an exit light intensity present in an oblique direction inclined at a predetermined angle with respect, to the normal line of the surface light source and a spread angle range wider than that of the first illumination light, and allows the converted light to exit therefrom. The display drive circuit supplies an image signal to each pixel in the liquid crystal display device to display an image in the liquid crystal display device. The light source drive circuit controls lighting states of the first and the second light sources in accordance with an image displayed in the liquid crystal display device.

In this liquid crystal display apparatus, it is preferable for the light source drive circuit to selectively control a lighting state of the first light source alone and a simultaneous lighting state of the first and the second light sources in accordance with a viewing angle selection signal supplied from the outside. Furthermore, it is preferable for the display drive circuit to selectively supply a display image signal corresponding to image data fed from the outside and a fixed image signal corresponding to a predetermined fixed image to the liquid crystal display device in accordance with a viewing angle selection signal transmitted from the outside in order to display each image. It is preferable for the light source drive circuit to turn on the first light-emitting element in accordance with display of a display image corresponding to a display image signal of the liquid crystal display device and turn on the second light-emitting element of elements in accordance with display of a fixed image corresponding to a fixed image signal of the liquid crystal display device based on a viewing angle selection signal supplied from the outside.

Moreover, it is preferable for the controller in this liquid crystal display apparatus to perform the following operation. That is, when wide-viewing angle display is selected based on a viewing angle selection signal supplied from the outside, the display drive circuit supplies a display image signal corresponding to image data to each pixel in the liquid crystal display device to display a display image in the liquid crystal display device. The light source drive circuit turns on the first and second light sources or light-emitting elements at equal rates in synchronization with supply of the display image signal to each pixel. When narrow-viewing angle display is selected based on a viewing angle selection signal supplied from the outside, the display drive circuit alternately supplies a display image signal corresponding to image data and a fixed image signal corresponding to a fixed image having a predetermined pattern to each pixel in the liquid crystal display device to display each image in the liquid crystal display device. The light source drive circuit turns on the first light-emitting element in synchronization with supply of the display image signal to each pixel, and turns on the second light-emitting element in synchronization with supply of the fixed image signal to each pixel.

Moreover, it is preferable for the display drive circuit in this liquid crystal display apparatus to supply a display image signal required to display the display image to each pixel in the liquid crystal display device during a first sub-frame obtained by dividing one frame constituted of a period for supply of an image signal required to display one pixel into two, and selectively supply the display image signal and a fixed image signal formed of the image having the predetermined pattern to each pixel in the liquid crystal display device during the second sub-frame obtained by dividing the one frame into two based on a viewing angle selection signal fed from the outside. It is preferable for the light source drive circuit to turn on the first light source in synchronization with supply of the display image signal to each pixel in the first sub-frame, and turn on the first light source in synchronization with supply of the display image signal to each pixel and turn on the second light sources in synchronization with supply of the fixed image signal to each pixel in the second sub-frame. In this case, the following structure is desirable. That is, the liquid crystal display device includes a field sequential driving liquid crystal display panel that controls a transmission factor of light without having color filters. Each of the first and the second light sources includes a plurality of first and second light-emitting elements that selectively generate lights of red, green, and blue. The controller supplies a display image signal corresponding to each color, e.g., red, green, or blue of the display image to each pixel in the liquid crystal display device in accordance with each field obtained by dividing the first sub-frame into three, and supplies a fixed image signal corresponding to each color, e.g., red, green, or blue of one of the display image signal and the fixed image signal selected based on the viewing angle selection signal in accordance with each field obtained by dividing the second sub-frame into three. The light source drive circuit generates light having a corresponding color from the first light-emitting element in synchronization with supply of the display image signal of each color to each pixel in accordance with each field in the first sub-frame, generates light having a corresponding color from the first, light-emitting element in synchronization with supply of the display image signal of each color to each pixel and generates light having a corresponding color from the second light emitting element in synchronization with supply of the fixed image signal of each color in accordance with each field in the second sub-frame.

Third Embodiment

FIGS. 14 and 15 show a surface light source 90 according to a third embodiment of the present invention. FIG. 14 is a front view of the surface light source 90 arranged to face a rear surface of the liquid crystal display device on an opposite side of an observation side as seen from an exit side. FIG. 15 is a cross-sectional view taken along a line XV-XV in FIG. 14. It is to be noted that like reference numerals denote the same members as those in the first embodiment, thereby omitting an explanation thereof.

The surface light source 90 according to this embodiment is arranged to face a surface of a liquid crystal display device 1 on an opposite side of an observation side like the liquid crystal display apparatus depicted in FIG. 1. This surface light source 90 has a light guide plate 91 formed of a tabular transparent member, e.g., an acrylic resin plate, a prism sheet 92 that allows light from this light guide plate 91 to exit toward the liquid crystal display device 1, and a first light-emitting element 25a and second light-emitting elements 25b and 25c that allow light to enter the light guide plate 91.

The light guide plate 91 has an incidence facet 93, a plurality of arc-like inclined front surfaces 94, and a rear reflection surface 97. The incidence facet 93 is formed on a facet corresponding to one edge as seen from the observation side of the liquid crystal display device 1, e.g., one edge side (an upper edge in the drawing) in a vertical direction of a screen of the liquid crystal display device 1 of facets surrounding the tabular transparent member, and allows light to enter therefrom. The plurality of arc-like inclined surfaces 94 are concentrically formed along a semicircle with a central position 93a of the incidence facet 93 in a length direction at the center, inclined in a radial direction at a substantially equal angle, and change a direction of light that, has entered from the incidence facet 93 so that this light exits toward the liquid crystal display device 1 side. The reflection surface 97 is formed on a plate surface of the tabular transparent member on the opposite side, and reflects light that has entered from the incidence facet 93 toward the plurality of arc-like inclined surfaces 94.

The prism sheet 92 is arranged on the exit side of the light guide plate 91, and constituted of a plurality of arc-like prisms 95 and an exit surface 96. The plurality of arc-like prisms 95 are circularly formed along a concentric semicircle with the central position 93a corresponding to a curvature center of the arc-like inclined surfaces 94 of the light guide plate 91 at the center on a surface facing the light guide plate 91, and reflect light exiting from the arc-like inclined surfaces 94 of the light guide plate 91 to a direction along which an angle with respect to a normal line direction 100 of the liquid crystal display device 1 is reduced (a front direction), The exit surface 96 allows light refracted by the plurality of arc-like prisms 95 to exit toward the light crystal display device 1 side on the surface facing the liquid crystal display device 1. The light guide plate 91 and the prism sheet 92 constitute optical deflecting means 110.

The first light-emitting element 25a is arranged to face the center of the central position 93a of the incidence facet 93 of the light guide plate 91 in such a manner that light spreading in a radial pattern from the curvature center of the arc-like inclined surfaces 94 exits toward the incidence facet 93 of the light guide plate 91. Further, the second light-emitting elements 25b and 25c are arranged at positions separated in the lateral direction from the central position 93a of the incidence facet 93 of the light guide plate 91 in the length direction by a substantially equal distance.

The plurality of arc-like inclined surfaces 94 of the light guide plate 91 are constituted of inclined surfaces inclined at a predetermined angle toward the center of the semicircle, and concentrically formed with a pitch that is substantially equal to or smaller than a pixel pitch of the liquid crystal display device 1.

Moreover, each of the plurality of arc-like prisms 95 of the prism sheet 92 has an isosceles triangular cross-sectional shape, and these prisms are concentrically formed with a pitch smaller than that of the plurality of arc-like inclined surfaces 94 of the light guide plate 91.

In this embodiment, the reflection film 98 is provided and formed on the reflection surface 97 of the light guide plate 91 on the opposite side of the arc-like prisms 95. However, this reflection surface 97 of the light guide plate 91 may be an internal reflection surface that totally reflects incident light from the incidence facet 93 on an interface between the plate surface of the light guide plate 91 and outside air.

This surface light source 90 changes a direction of light that has entered the light guide plate 91 of the optical deflecting means 110 from the incidence facet 93 by using the plurality of arc-like inclined surfaces 94 and allows this light to exit the light guide plate 91 as indicated by arrows in FIG. 15. The plurality of arc-like prisms 95 of the prism sheet 92 refract this light to exit from the exit surface 96 of this prism sheet 92 toward the liquid crystal display device 1 side. An inclination angle of the plurality of arc-like inclined surfaces 94 of the light guide plate 91 and an inclination angle of two inclined surfaces of each of the plurality of arc-like prisms 95 of the prism sheet are set in such a manner that light having high directivity in a normal line direction 100 of the liquid crystal display device 1 exits from the exit surface 96 of the prism sheet 92 when light spreads in a radial pattern in a direction along a plane substantially parallel to the plate surface of the light, guide plate 91 enters the light guide plate 91 from the curvature center of the arc-like inclined surfaces 94.

This surface light source 90 turns on the first light-emitting element 25a to emit toward the liquid crystal display device 1 first illumination light that has a peak of an exit light intensity present in the normal line direction 100 of the liquid crystal display device 1 and high directivity in the front direction of a narrow spread angle. Furthermore, the surface light source 90 turns on the two second light-emitting elements 25b and 25c to emit toward the liquid crystal display device 1 second illumination lights each having an intensity distribution in which an intensity of oblique light inclined with respect to the normal line direction 100 is higher than an intensity of the front light.

Therefore, this surface light source 90 is arranged on the opposite side of the observation side of the liquid crystal display device 1, and the controller 27 applies an image signal corresponding to image data to each pixel in the liquid crystal display device 1 like the first and second embodiments. When narrow-viewing angle display is selected based on a viewing angle selection signal, the first light-emitting element 25a of the surface light source 90 is turned on in synchronization with application of the image signal. Moreover, when wide-viewing angle display is selected, the first light-emitting element 25a and the second light-emitting elements 25b and 25c of the surface light source 90 are simultaneously or alternately turned on in synchronization with application of the image signal. As a result, a viewing angle of display can be controlled to both a narrow viewing angle and a wide viewing angle.

Additionally, in the liquid crystal display apparatus according to this embodiment, the optical deflecting means 110 formed of the light guide plate 91 and the prism sheet 92, and the surface light source 90 including the first and the second light-emitting elements 25a, 25b, and 25c are arranged on the opposite side of the observation side of the liquid crystal display device 1, thereby simplifying the structure of the liquid crystal display apparatus.

In this embodiment, likewise, it is preferable for the surface light source 90 to further include an anisotropic diffusion plate that is arranged on the exit side of the optical deflecting means and diffuses light in a direction inclined with respect to the normal line direction 100 of light exiting from the optical deflecting means 100. According to this configuration, a viewing angle of narrow-viewing angle display can be effectively reduced, and a viewing angle of wide-field display can be further increased.

Other Embodiments

In the liquid crystal display apparatus according to the present invention, the optical deflecting means of the surface light source arranged on the opposite side of the observation side of the liquid crystal display device 1 is not restricted to the light guide plate 11 according to the first embodiment or the light guide plate 91 and the prism sheet 92 according to the third embodiment, and other structure may be adopted.

Further, the surface light source 9 or 90 includes the single first light-emitting element 25a and the two second light-emitting elements 25b and 25c in the foregoing embodiments. However, one or more second light-emitting elements may be arranged at positions separated from the central position of the incidence facet 12 or 93 of the optical deflecting means 10 or 110 in the length direction of the incidence facet 12 or 93.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display apparatus comprising:
a liquid crystal display panel in which a plurality of pixels are arranged in a matrix form;
a light guide plate including an exit surface facing the liquid crystal display panel, a flat light incidence facet, and an opposite surface opposite from the exit surface, wherein the light guide plate guides light incident from the flat light incidence facet to the exit surface via the opposite surface, wherein the opposite surface comprises a reflecting pattern which reflects the incident light toward the exit surface such that an angle of a peak intensity of exit light emitted from the exit surface varies according to a light incident position on the flat light incidence facet;
a first light-emitting element configured to emit first light onto said flat light incidence facet so that the exit light emitted from the exit surface has a first peak intensity that is at angle perpendicular to the exit surface;
a second light-emitting element configured to emit second light onto said flat light incidence facet so that the exit light emitted from the exit surface has a second peak intensity that is at an angle inclined only to a first direction from perpendicular to the exit surface;
a first memory for storing display image data which are successively supplied from an outside;
a second memory for storing predetermined fixed image data or the display image data successively supplied from the outside;
a display control section for causing the liquid crystal display panel to perform display based alternately on the image data stored in the first memory and the image data stored in the second memory, at a predetermined timing; and
a light source control section for controlling the first and second light-emitting elements to alternately emit the first and second lights in synchronization with the predetermined timing,
wherein the reflecting pattern includes a plurality of arc-like inclined surfaces which do not cross each other and which have a common central position at a first position, which is a central position of the flat light incidence facet; and
wherein the first light-emitting element is arranged to face the first position, and the second light-emitting element is positioned to face a second position of the flat light incidence facet that is apart from the first position.

2. The liquid crystal display apparatus according to claim 1, wherein said light source control section (i) controls the first light-emitting element to emit the first light when the display control section causes the liquid crystal display panel to perform display based on the image data stored in the first memory, and (ii) controls the second light-emitting element to emit the second light when the display control section causes the liquid crystal display panel to perform display based on the image data stored in the second memory.

3. The liquid crystal display apparatus according to claim 1, further comprising a third light-emitting element which is controlled by the light source control section to emit third light onto said flat light incidence facet so that the exit light emitted from the exit surface has a third peak intensity that is at an angle inclined only to a second direction from perpendicular to the exit surface, wherein the angle of the exit light generated by the second light is symmetric with the angle of the exit light generated by the third light.

4. The liquid crystal display apparatus according to claim 1, further comprising a memory write control section for writing into the second memory: (i) the predetermined fixed image data at a time of a narrow-viewing angle display, and (ii) the display image data successively supplied from the outside at a time of a wide-viewing angle display.

5. The liquid crystal display apparatus according to claim 1, wherein said second light-emitting element is arranged such that the angle of the exit light is 20° from a normal line of the exit surface of the light guide plate.

6. The liquid crystal display apparatus according to claim 1, wherein said fixed image data corresponds to a checked pattern.

7. The liquid crystal display apparatus according to claim 1, wherein the first peak intensity is higher than the second peak intensity.

8. A liquid crystal display apparatus comprising:
a liquid crystal display panel in which a plurality of pixels are arranged in a matrix form;
a light guide plate including an exit surface facing the liquid crystal display panel, a flat light incidence facet, and an opposite surface opposite from the exit surface, wherein the light guide plate guides light incident from the flat light incidence facet to the exit surface via the opposite surface, wherein the opposite surface comprises a reflecting pattern which reflects the incident light toward the exit surface such that an angle of a peak intensity of exit light emitted from the exit surface varies according to a light incident position on the flat light incidence facet;
a first light-emitting element configured to emit first light onto said flat light incidence facet so that the exit light emitted from the exit surface has a first peak intensity that is at angle perpendicular to the exit surface;
a second light-emitting element configured to emit second light onto said flat light incidence facet so that the exit light emitted from the exit surface has a second peak intensity that is at an angle inclined only to a first direction from perpendicular to the exit surface;
a light source control section for controlling the first and second light-emitting elements to alternately emit the first and second lights;
a first memory for storing display image data which are successively supplied from an outside;
a second memory for storing predetermined fixed image data or the display image data successively supplied from the outside; and
a display control section for causing the liquid crystal display panel to (i) perform display based on the image data stored in the first memory when the first light-emitting element emits the first light, and (ii) perform display based on the image data stored in the second memory when the second light-emitting element emits the second light,
wherein the reflecting pattern includes a plurality of arc-like inclined surfaces which do not cross each other and which have a common central position at a first position, which is a central position of the flat light incidence facet; and
wherein the first light-emitting element is arranged to face the first position, and the second light-emitting element is positioned to face a second position of the flat light incidence facet that is apart from the first position.

9. The liquid crystal display apparatus according to claim 8, further comprising a third light-emitting element which is controlled by the light source control section to emit third light onto said flat light incidence facet so that the exit light emitted from the exit surface has a third peak intensity that is at an angle inclined only to a second direction from perpendicular to the exit surface, wherein the angle of the exit light generated by the second light is symmetric with the angle of the exit light generated by the third light.

10. The liquid crystal display apparatus according to claim 8, further comprising a memory write control section for writing into the second memory: (i) the predetermined fixed image data at a time of a narrow-viewing angle display, and (ii) the display image data successively supplied from the outside at a time of a wide-viewing angle display.

11. The liquid crystal display apparatus according to claim 8, wherein said second light-emitting element is arranged such that the angle of the exit light is 20° from a normal line of the exit surface of the light guide plate.

12. The liquid crystal display apparatus according to claim 8, wherein said fixed image data corresponds to a checked pattern.

13. The liquid crystal display apparatus according to claim 8, wherein the first peak intensity is higher than the second peak intensity.

14. The liquid crystal display apparatus according to claim 1, wherein the plurality of arc-like inclined surfaces are inclined at a same angle.

15. The liquid crystal display apparatus according to claim 8, wherein the plurality of arc-like inclined surfaces are inclined at a same angle.

* * * * *